(12) United States Patent
Mihara et al.

(10) Patent No.: US 8,599,107 B2
(45) Date of Patent: Dec. 3, 2013

(54) IMAGE SYSTEM, DISPLAY DEVICE AND EYEGLASSES DEVICE USED IN THE SAME

(75) Inventors: Kazuhiro Mihara, Osaka (JP); Hiroshi Miyai, Hyogo (JP); Katsuo Saigo, Hyogo (JP); Masafumi Shimotashiro, Osaka (JP); Seiji Nakazawa, Osaka (JP); Masayuki Kozuka, Osaka (JP); Yoshiho Gotoh, Osaka (JP)

(73) Assignee: Panasonic Corporation, Osaka (JP)

( * ) Notice: Subject to any disclaimer, the term of this patent is extended or adjusted under 35 U.S.C. 154(b) by 808 days.

(21) Appl. No.: 12/549,744

(22) Filed: Aug. 28, 2009

(65) Prior Publication Data

US 2010/0315316 A1     Dec. 16, 2010

Related U.S. Application Data

(60) Provisional application No. 61/185,683, filed on Jun. 10, 2009.

(51) Int. Cl.
G09G 3/00 (2006.01)

(52) U.S. Cl.
USPC .......................................................... 345/32

(58) Field of Classification Search
None
See application file for complete search history.

(56) References Cited

U.S. PATENT DOCUMENTS

| | | | |
|---|---|---|---|
| 8,134,591 B2 * | 3/2012 | Marcus et al. | 348/54 |
| 2001/0043266 A1 * | 11/2001 | Robinson et al. | 348/53 |
| 2002/0118276 A1 * | 8/2002 | Seong | 348/53 |
| 2008/0151193 A1 * | 6/2008 | Reder | 353/7 |
| 2009/0231697 A1 * | 9/2009 | Marcus et al. | 359/465 |
| 2009/0237327 A1 * | 9/2009 | Park et al. | 345/8 |
| 2010/0085424 A1 * | 4/2010 | Kane et al. | 348/53 |
| 2010/0177171 A1 * | 7/2010 | Marcus et al. | 348/53 |

FOREIGN PATENT DOCUMENTS

JP    3421889    4/2003

* cited by examiner

Primary Examiner — Joseph Haley
Assistant Examiner — Emily Frank
(74) Attorney, Agent, or Firm — Wenderoth, Lind & Ponack, L.L.P.

(57) ABSTRACT

An image system includes: a display device configured to display an image; and an eyeglasses device for viewing the image displayed by the display device, wherein the display device includes: a display portion configured to display in time series the image to be viewed through the eyeglasses device; a signal generation portion configured to generate a synchronization signal for synchronizing timing of switching of frames of the image; and a transmission portion configured to transmit the synchronization signal, the eyeglasses device includes: an optical filter portion configured to adjust an amount of light of the image; a reception portion configured to receive the synchronization signal transmitted from the transmission portion; and a control portion configured to control action of the optical filter portion corresponding to the switching of the frames of the image, based on the synchronization signal, the signal generation portion further generates a parameter signal including action information for defining an action of the optical filter portion, the transmission portion transmits the parameter signal to the reception portion, and the control portion controls the action of the optical filter portion according to the action information of the parameter signal for defining the action of the optical filter portion.

8 Claims, 21 Drawing Sheets

IMAGE SYSTEM, DISPLAY DEVICE AND EYEGLASSES DEVICE USED IN THE SAME

This application claims the benefit of U.S. Provisional Application No. 61/185,683 filed Jun. 10, 2009.

BACKGROUND OF THE INVENTION

1. Field of the Invention

The present invention relates to a display device for displaying images, to an eyeglasses device used to view images, and to an image system with the display device and eyeglasses device.

2. Description of the Background Art

Image systems for showing viewers, for example, stereoscopic images with a display device configured to display images and an eyeglasses device used for viewing images have been developed. For example, Japanese Patent No. 3,421,889 discloses an image system comprising a display device configured to apply time division and interlaced display to images for the left eye and the right eye, respectively, and an eyeglasses device for controlling its filters for the left and right eyes so as to adjust a light transmission through the filters in synchronization with switching between frames of the images for the left and right eyes. This image system synchronizes the switching between the frames of the images for the left eye and the right eye with the control for adjusting the light transmission using encoded signal communication of frame frequency or frame period between the display device and the eyeglasses device.

An image system of the prior art such as the disclosed art in Japanese Patent No. 3,421,889 comprises a combination of a single display device and an eyeglasses devices for dedicated use with this display device. The above-described control for the synchronization may be achieved by preparing a dedicated eyeglasses device corresponding to a specific model of a display device.

Audio and video equipment such as television sets, on which consumers generally demand a lot for its better performance, is frequently upgraded. Moreover, widely varied consumer demands on the performance likely make various types of display devices and viewing device launched into the market.

Prior image systems do not address the frequent upgrades of display the devices or the eyeglasses devices. The prior image systems do not also accept various combinations of the display devices and the eyeglasses devices. Hence, for example, when a consumer purchases a newly upgraded display device, she/he also has to simultaneously purchase a new dedicated eyeglasses devices in order to evaluate the images of the various display devices at an audio/video equipment store where a wide variety of the display devices or the eyeglasses devices are sold, so that her/his purchase motivation may be shrunk. Thus, this may be a major barrier against spreading the image systems.

SUMMARY OF THE INVENTION

An object of this invention is to provide an image system which allows combinations of the wide variety of the display devices and the eyeglasses devices.

The image system of one aspect of the invention includes: a display device configured to display an image; and an eyeglasses device for viewing the image displayed by the display device, wherein the display device includes: a display portion configured to display in time series the image to be viewed through the eyeglasses device; a signal generation portion configured to generate a synchronization signal for synchronizing timing of switching of frames of the image; and a transmission portion configured to transmit the synchronization signal, the eyeglasses device includes: an optical filter portion configured to adjust an amount of light of the image; a reception portion configured to receive the synchronization signal transmitted from the transmission portion; and a control portion configured to control action of the optical filter portion corresponding to the switching of the frames of the image, based on the synchronization signal, the signal generation portion further generates a parameter signal including action information for defining an action of the optical filter portion, the transmission portion transmits the parameter signal to the reception portion, and the control portion controls the action of the optical filter portion according to the action information of the parameter signal for defining the action of the optical filter portion.

The display device of another aspect of the invention includes: a display portion configured to display in time series an image to be viewed through an eyeglasses device configured to adjust an amount of light; a signal generation portion configured to generate a synchronization signal for synchronizing timing of switching of frames of the image; and a transmission portion configured to transmit the synchronization signal, wherein the signal generation portion further generates a parameter signal including action information for defining an action of the eyeglasses device regarding adjustment of the amount of the light of the image.

The eyeglasses device of still another aspect of the invention includes an optical filter portion configured to adjust an amount of light of an image; a reception portion configured to receive a synchronization signal for synchronizing timing of switching of frames of the image and a parameter signal including action information for defining an action of the optical filter portion; and a control portion configured to control the optical filter portion corresponding to the switching of the frames of the image based on the synchronization signal and the parameter signal according to the action information of the parameter signal for defining the action of the optical filter portion.

DETAILED DESCRIPTION OF THE PREFERRED EMBODIMENTS OF THE INVENTION

Below, an embodiment of the invention is explained, referring to the accompanying drawings. In the following explanation, terms used to represent directions, such as "upward", "downward", "leftward" and "rightward", are used merely for the purpose of clarifying the explanation, and in no way limit the scope of the invention. The term "bit series" used in the following explanation means a pulse train formed by combining a plurality of pulses each of which corresponds to one bit of data.

Figure 1:
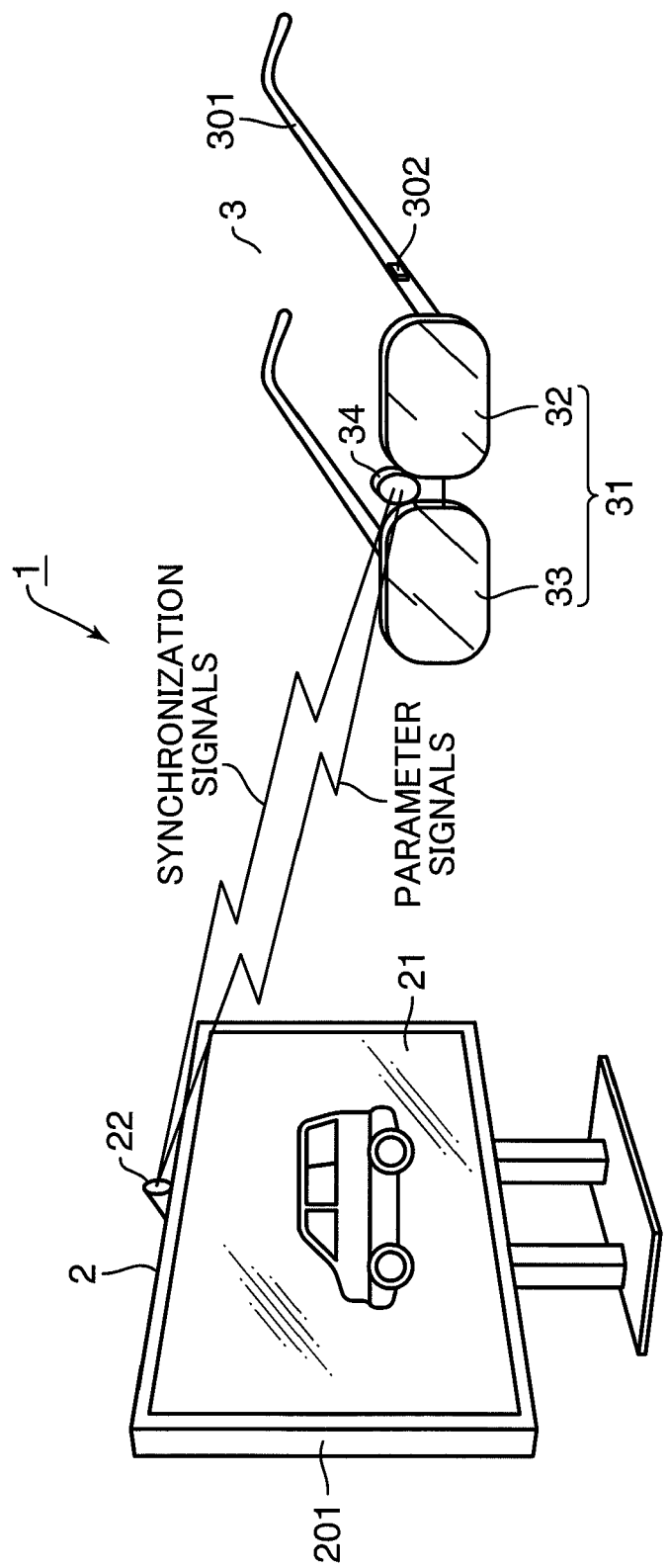
FIG. 1 schematically shows the image system according to one embodiment of the invention.

FIG. 1 schematically shows an image system of one embodiment according to the invention. The image system 1 comprises a display device 2 configured to display images, and an eyeglasses device 3 used to view the images displayed by the display device 2. The display device 2 comprises a display panel 21, used as one example of a display portion, on which images viewed by a viewer through the eyeglasses device 3 are displayed. An outer periphery of the display 21 is surrounded by a housing 201 which is an outer surface of the display device 2.

Figure 2:
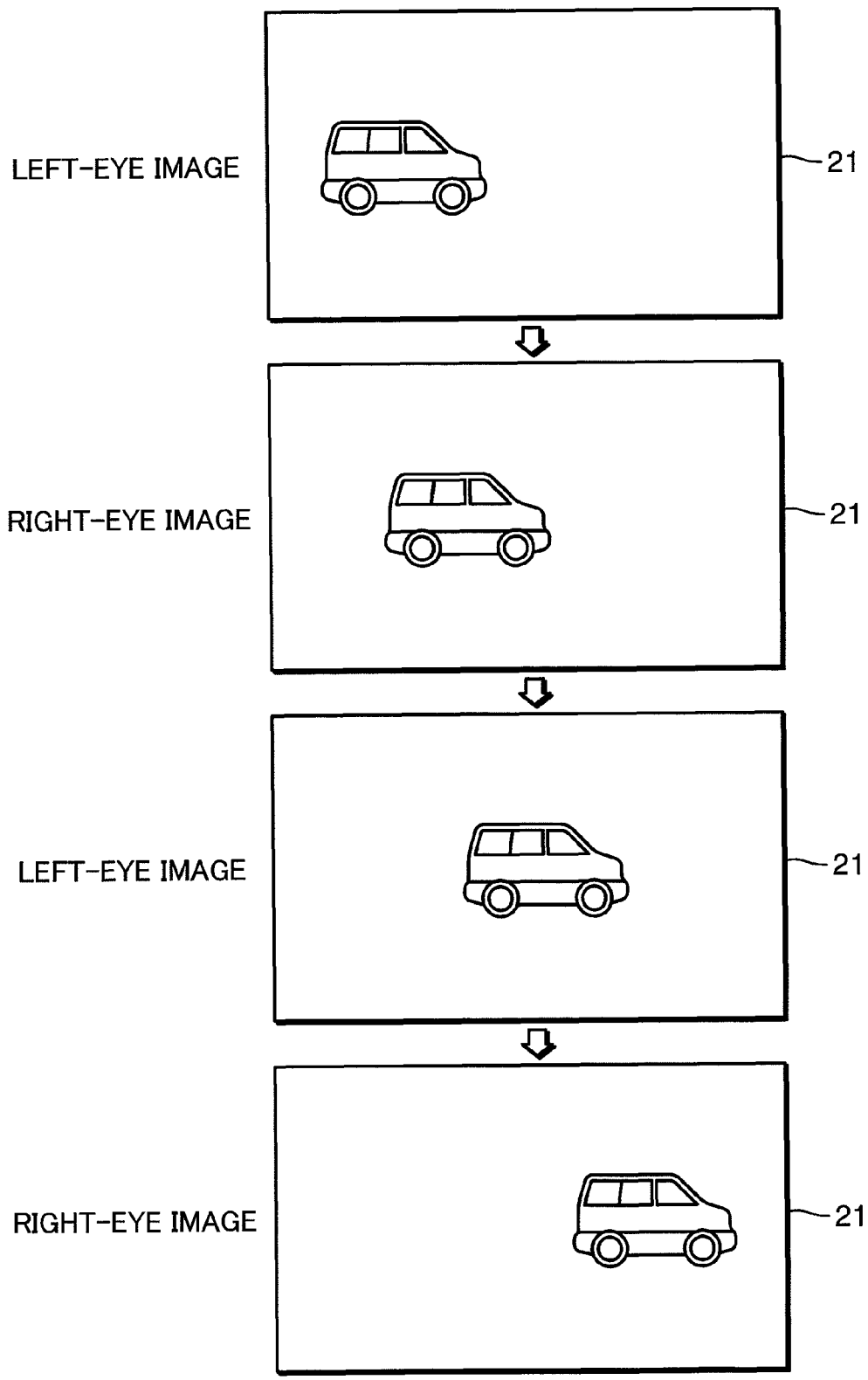
FIG. 2 shows an example of an image displayed by the display device of the image system shown in FIG. 1.

FIG. 2 shows an example of the image displayed on the display panel 21. As shown in FIG. 2, the image is displayed in time series on the display panel 21. The display panel 21 shown in FIG. 2 alternately displays the images for the left eye and the right eye. The present invention is not, however, limited to such a configuration, and the display panel 21 may, after displaying a prescribed number of the images for the left eye or for the right eye, display a prescribed number of the images for the right eye or for the left eye. In this embodiment, by alternately displaying the images for the left eye and the right eye, the display panel 21 causes the viewer to view a three-dimensional stereoscopic image. Hence it should be understood that the images for the left eye and the images for the right eye shown in FIG. 2 include contents different by the extent of parallax therebetween, respectively.

Figure 3:
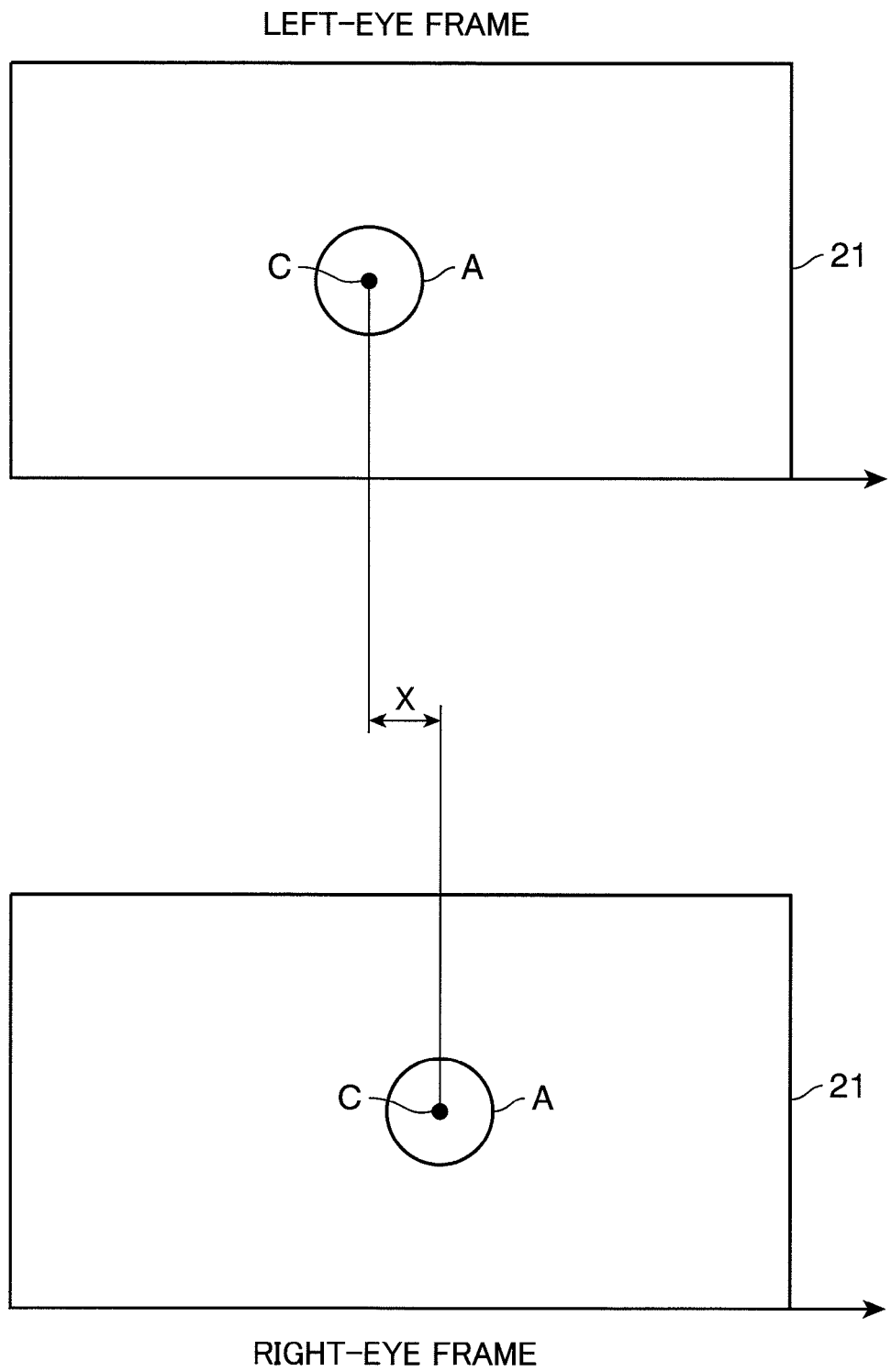
FIG. 3 schematically explains the parallax of a three-dimensional stereoscopic image.

FIG. 3 explains the parallax between the images for the left eye and the images for the right eye. In an upper section of FIG. 3, a frame of the image for the left eye is shown in the display panel 21 and in a lower section of FIG. 3, a frame of the image for the right eye is shown in the display panel 21. The object "A" displayed in both frames is the same object of interest, but an angle and a position of the object "A" shown in the display panel 21 are different according to a magnitude of the parallax. This difference in the angle and the position may be considered as the difference in the content due to the parallax experienced by the viewer between the image frames for the left eye and the image frames for the right eye. The object "A" shown in FIG. 3 is shown as a circular figure in order to facilitate the explanation, therefore no difference in shape is observed between the image frames for the left eye and the image frames for the right eye, but the shapes of the object displayed in the image frames for the left eye and the right eye may also be different to the extent of the parallax, depending on the shape of an object "A". The difference in the displayed content due to the parallax between the image frames for the left eye and the right eye shown in FIG. 3 is just shown for clarity of explanation, therefore other differences between the images to be viewed by the left eye and the right eye may be also considered as the difference in the content due to the parallax.

Referring again to FIG. 1, the display device 2 further comprises an infrared light-emitting element 22. The infrared light-emitting element 22 is mounted on an upper edge of the housing 201. The infrared light-emitting element 22 is used as a transmission portion configured to transmit signals used in control of the eyeglasses device 3. The signals transmitted by the infrared light-emitting element 22 include synchronization signals used for synchronization between the images displayed in the display panel 21 and the control of the eyeglasses device 3, and parameter signals used for control of action of the eyeglasses device 3.

The eyeglasses device 3 overall substantially looks like eyeglasses for vision correction. The eyeglasses device 3 comprises an optical filter portion 31 which includes a left-eye optical filter 32 positioned in front of the left eye of the viewer and a right-eye optical filter 33 positioned in front of the right eye of the viewer when she/he wears the eyeglasses device 3. The eyeglasses device 3 adjusts the light transmission from the images to the left eye using the left-eye optical filter 32, and adjusts the light transmission from the images to the right eye using the right-eye optical filter 33. Based on the synchronization signals transmitted from the infrared light-emitting element 22, the adjustment for the light transmission is synchronized with the images outputted to the display panel 21 of the display device 2. The viewer feels the parallax from the images viewed by the left eye and by the right eye, and perceives the image displayed by the display device 1 as a stereoscopic image.

The eyeglasses frame 301 extends from each of the left-eye optical filter 32 and the right-eye optical filter 33. A power supply switch 302 is provided on the eyeglasses frame 301 extending from the left-eye optical filter 32. The viewer may operate the power supply switch 302 of the eyeglasses device 3 to be turned on or off.

The eyeglasses device 3 further comprises an infrared light-receiving element 34 to be used as a reception portion configured to receive the synchronization signals and the parameter signals transmitted from the infrared light-emitting element 22 of the display device 2. The eyeglasses device 3 controls the optical filter portion 31 to adjust the amounts of the light incident on the left and right eyes, based on the synchronization signals and the parameter signals. In the following explanation, the phrase "open the optical filter portion 31", "open left-eye optical filter 32", "open right-eye optical filter 33", or any similar expressions mean any actions of the optical filter portion 31, left-eye optical filter 32, or right-eye optical filter 33 to increase the amount of the light incident on both eyes, on the left eye, or on the right eye. Further, the phrase "close the optical filter portion 31", "close left-eye optical filter 32", "close right-eye optical filter 33", or any similar expressions, mean any actions of the optical filter portion 31, left-eye optical filter 32, or right-eye optical filter 33 to decrease the amount of the light incident on both eyes, on the left eye, or on the right eye. The synchronization signals are used for a control to open and/or close the optical filter portion 31, the left-eye optical filter 32, or the right-eye optical filter 33 in correspondence with the switching of the image frames displayed by the display device 2, and the parameter signals are used to control actions to open and/or close the optical filter portion 31, the left-eye optical filter 32, or the right-eye optical filter 33. A viewer wearing the eyeglasses device 3 may appropriately view the images displayed by the display device 2 through the controls based on the synchronization signals and the parameter signals.

Figure 4:
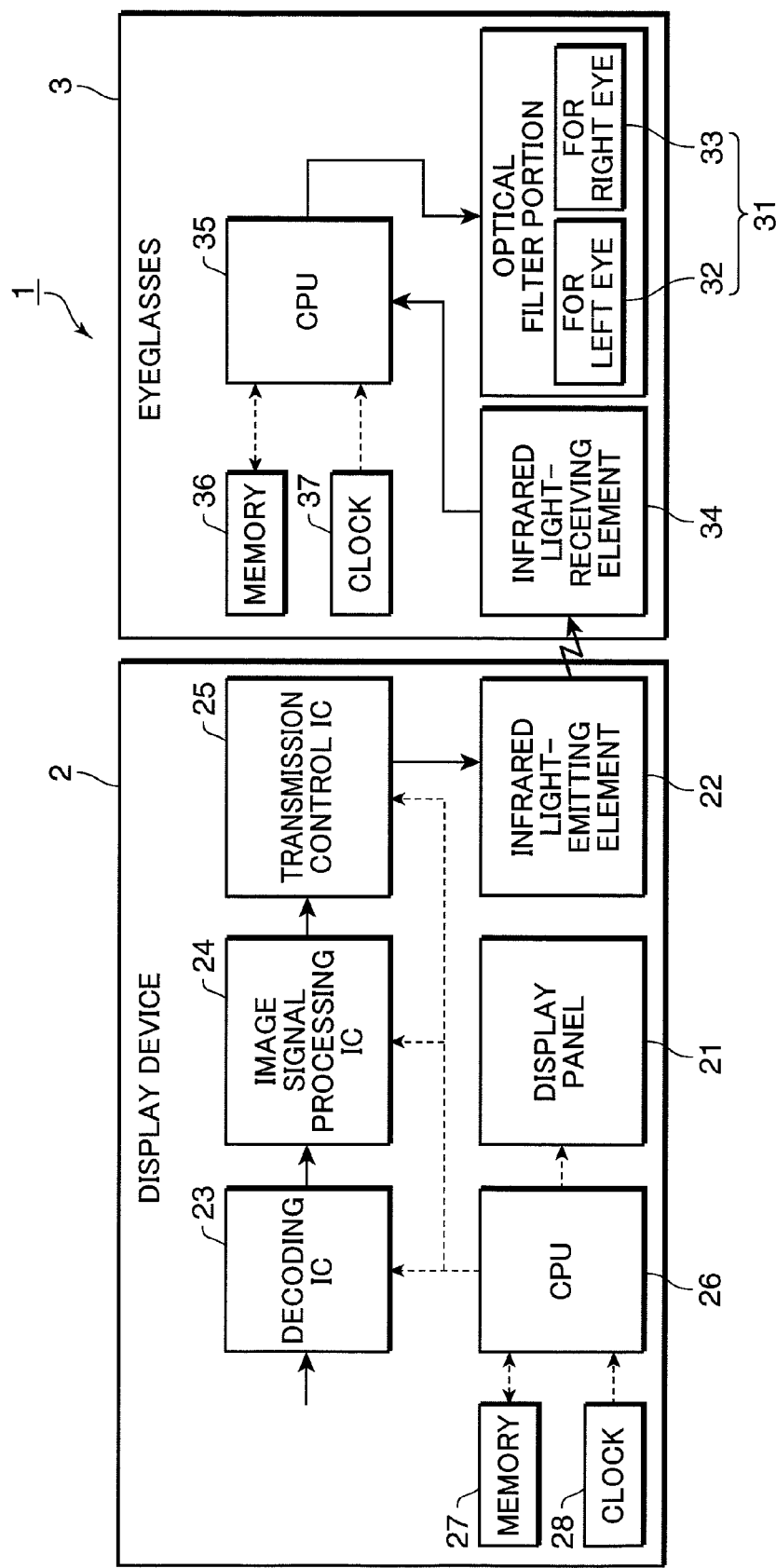
FIG. 4 shows an example of the hardware configuration of the image system shown in FIG. 1.

FIG. 4 shows a hardware configuration of the display device 2 and the eyeglasses device 3. A portion of the hardware configuration of the display device 2 shown in FIG. 4 may be accommodated within the housing 201 shown in FIG. 1. A portion of the hardware configuration of the eyeglasses device shown in FIG. 4 may be accommodated within the eyeglasses frame 301 shown in FIG. 1. The display device 2 comprises a decoding IC 23, an image signal processing IC 24, a transmission control IC 25, a CPU 26, a memory 27, a clock 28, the display panel 21, and the infrared light-emitting element 22.

The decoding IC 23 is configured to decode encoded input signals of the image and output image data in a prescribed format. For example, MPEG (Motion Picture Experts Group)-2, MPEG-4, H264, or the other methods may be used for encoding the image.

The image signal processing IC 24 performs signal processing related to the display of the stereoscopic images. Through the processing of the image signals the image signal processing IC 24 executes, the image data from the decoding IC 23 is displayed as the stereoscopic images. In a specific embodiment, the image signal processing IC 24 may detect the images for the left eye and the right eye from the image data decoded by the decoding IC 23. The detected images for the left eye and the right eye are displayed in temporal alternation on the display panel 21. In another specific embodiment, the images for the left eye and for the right eye are automatically generated from the image data outputted by the decoding IC 23, and then the image signal processing IC 24 alternately outputs the generated images for the left eye and for the right eye to the display panel 21. After performing the signal processing related to the display for the stereoscopic images, the image signal processing IC 24 generates output signals with conformity to a signal input method of the display panel 21.

The image signal processing IC 24 may execute any processing other than the above processing as well. For example, the image signal processing IC 24 may further execute processing, for example, to adjust a hue of the displayed image according to characteristics of the display panel 21 or to raise the image frame rate by interpolating the image between the frames of the image data generated by the decoding IC 23.

The transmission control IC 25 generates the synchronization signals which are synchronized with the images for the left eye and for the right eye generated by the image signal processing IC 24, and then outputs the generated synchronization signals to the infrared light-emitting element 22.

The CPU 26 controls an entirety of the display device 2. The CPU 26 may control constituent portions of the display device 2 (for example, the decoding IC 23, the image signal processing IC 24, and the like) to effect control of the entirety of the display device 2. The CPU 26 may control the entirety of the display device 2 according to a program recorded in the memory 27 and according to external input (not shown).

The memory 27 is used as a region for recording the program to be executed by the CPU 26 and temporary data generated during the program execution. A volatile RAM (Random Access Memory) and a nonvolatile ROM (Read Only Memory) may be used as the memory 27.

The clock 28 supplies a clock signal which serves as an action reference for the CPU 26 and for the various ICs and the like.

The display panel 21 displays the image signals outputted from the image signal processing IC 24. A conventional CRT display method, an LCD employing liquid crystal elements, a PDP, organic luminescence display, or various other display methods may be applicable to the display panel 21.

Under control of the transmission control IC 25, the infrared light-emitting element 22 outputs the synchronization signals and the parameter signals to the infrared light-receiving element 34 using infrared beams. In this embodiment, the infrared light-emitting element 22 is used as the transmission portion configured to transmit these signals from the display device 2, but the invention is not limited to this configuration. In place of the infrared light-emitting element 22, an RF signal generator may be used. Further, in this embodiment the infrared signals are used to control the optical filter portion 31, but the invention is not limited to this configuration. Wire signals, wireless signals, or signals transmitted by ultrasound or by other transmission means may be used to control the optical filter portion 31.

The eyeglasses device 3 comprises a CPU 35, a memory 36, a clock 37, the infrared light-receiving element 34, and the optical filter portion 31.

The CPU 35 controls an entirety of the eyeglasses device 3. The CPU 35 controls the eyeglasses device 3 according to a program recorded in the memory 36 or the like and according to an external input (not shown).

The memory 36 is used as a region to record a program to be executed by the CPU 35 and data, and to hold temporary data during the program execution.

The clock 37 supplies a clock signal to the ICs and the like in the eyeglasses device 3. The clock signal serves as a reference for their actions. The clock signal may be divided or multiplied as necessary.

The infrared light-receiving element 223 is a light receiver configured to receive the synchronization signals transmitted from the infrared light-emitting element 22 of the display device 2, and is used as a synchronization signal reception portion. When an RF signal generator is used for the signal transmission, an RF signal receiver may be used as the reception portion in place of the infrared light-receiving element 223.

The optical filter portion 31 in front of the left eye and right eye of the viewer wearing the eyeglasses device adjusts the light transmission to the left eye and to the right eye. Under control of the CPU 35, the optical filter portion 31 performs appropriate actions to provide the desired optical effect for the left eye and for the right eye of the viewer wearing the eyeglasses device 3.

The hardware configuration shown in FIG. 4 is merely one example, and the invention is not limited thereto. For example, an IC integrating a plurality of ICs such as the decoding IC 23, image signal processing IC 24 may be used in the hardware configuration. Also, processing of the program may be executed by a PLD (Programmable Logic Device) or the like instead of the CPU 35.

Figure 5:
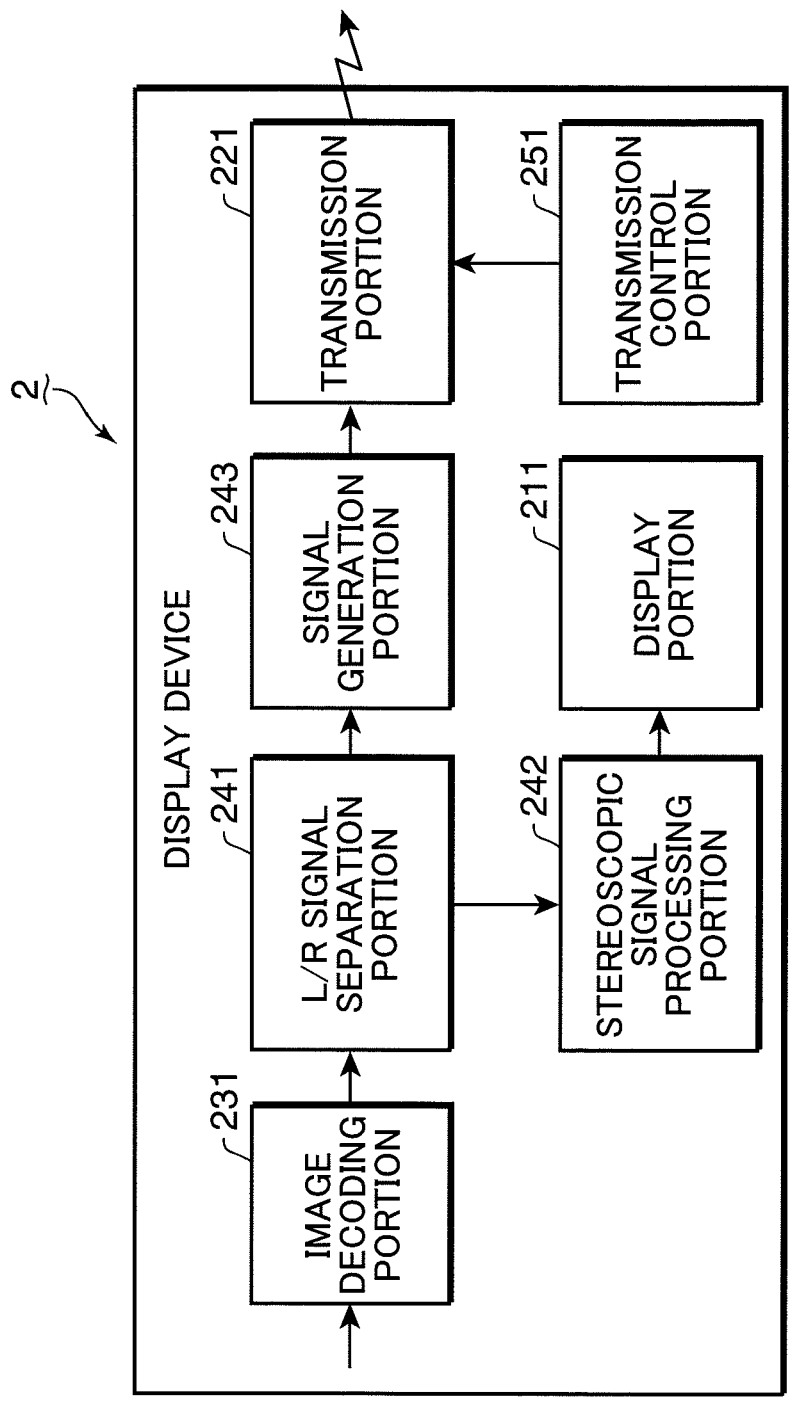
FIG. 5 shows an example of the functional configuration of the display device in the image system shown in FIG. 1.

FIG. 5 shows a functional configuration of the display device 2. The display device 2 comprises an image decoding portion 231, an L/R signal separation portion 241, a stereoscopic signal processing portion 242, a display portion 211, a signal generation portion 243, a transmission control portion 251, and a transmission portion 221.

The image decoding portion 231 decodes the encoded input signals of the image. In the hardware configuration shown in FIG. 4, the image decoding portion 231 corresponds to the decoding IC 23.

The L/R signal separation portion 241 generates the image signals for the left eye and the right eye from the image signals decoded by the image decoding portion 231 or separates the decoded image signals into the image signals for the left eye and the right eye.

The stereoscopic signal processing portion 242 adjusts the image signals for the left eye and for the right eye, which are separated by the L/R signal separation portion 241, according to the characteristics of the display portion 211 configured to display the images to be viewed through the eyeglasses device 3 shown in FIG. 1. For example, the stereoscopic signal processing portion 242 may execute processing to adjust the parallax between the images for the left eye and the right eye according to a size of the display panel 21 of the display portion 211.

The signal generation portion 243 generates the synchronization signals synchronized with or corresponding to the switching between the image frames for the left eye and the right eye, which are generated by the L/R signal separation portion 241. Thus the synchronization signals generated by the signal generation portion 243 include information related to a timing of the switching of the image frames. During this signal generation, types of the generated synchronization signals and/or timings of the signal generation may be adjusted according to the characteristics of the display portion 211 or other factors. The signal generation portion 243 further generates the parameter signals to control the actions of the optical filter portion 31 in the eyeglasses device 3 shown in FIG. 1.

The L/R signal separation portion 241, the stereoscopic signal processing portion 242, and the synchronization signal generation portion 243 correspond to the image signal processing IC 24 in the hardware configuration shown in FIG. 4.

The display portion 211 displays the image signals processed by the stereoscopic signal processing portion 242 as the images. As explained above, in the hardware configuration shown in FIG. 4 the display portion 211 corresponds to the display panel 21.

The signal transmission portion 221 transmits the synchronization signals and the parameter signals generated by the signal generation portion 243 to the infrared light-receiving element 34 of the eyeglasses device 3 shown in FIG. 1 under control of the transmission control portion 251. The signal transmission portion 221 corresponds to the infrared light-emitting element 22 in the hardware configuration shown in FIG. 4.

The transmission control portion 251 controls a data volume of the synchronization signals and the parameter signals to be transmitted or the transmission intervals thereof and the like. The transmission control portion 251 corresponds to the transmission control IC 25 in the hardware configuration shown in FIG. 4.

Figure 6:
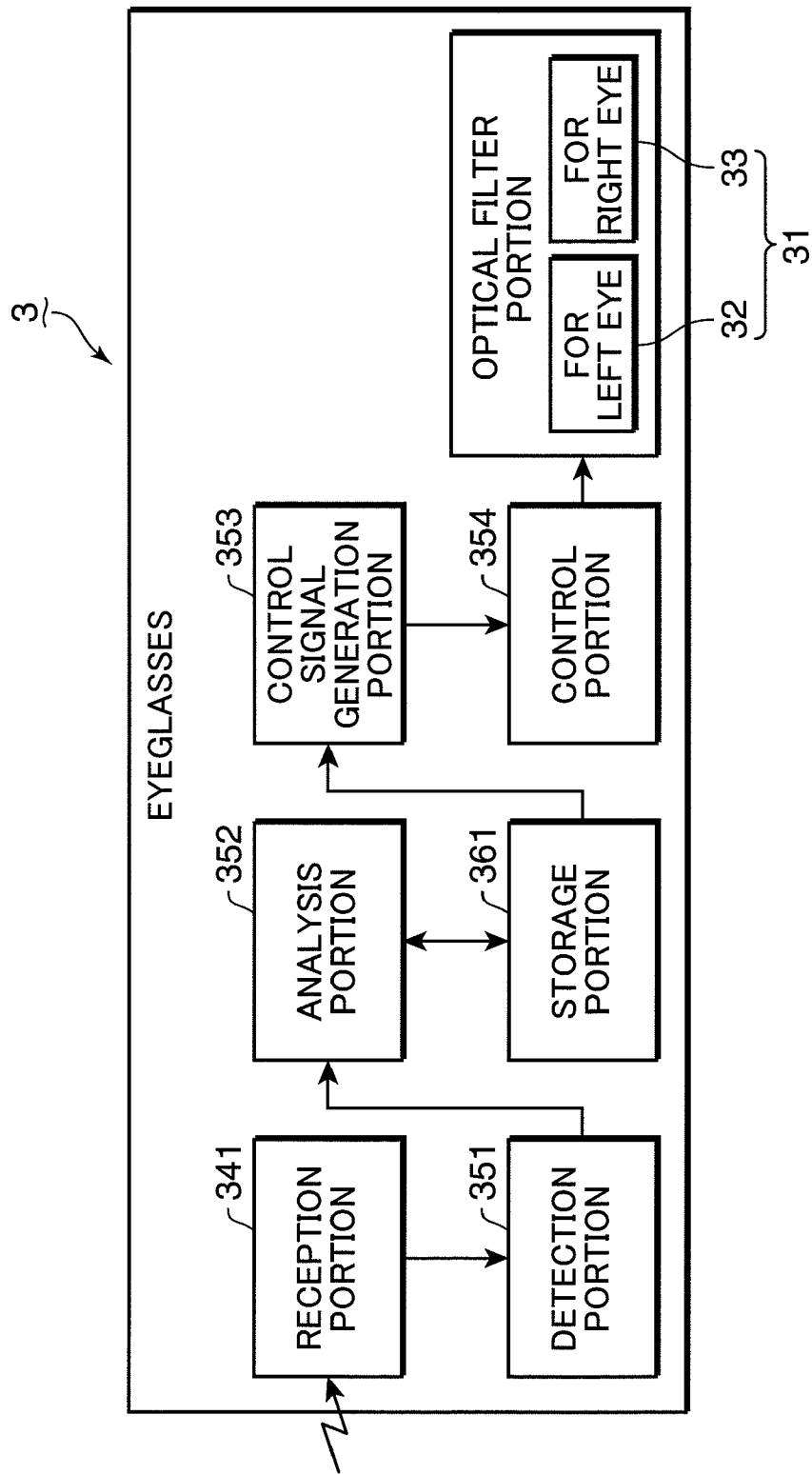
FIG. 6 shows an example of the functional configuration of the eyeglasses device in the image system shown in FIG. 1.

FIG. 6 shows a functional configuration of the eyeglasses device 3. The eyeglasses device 3 comprises a reception portion 341, a detection portion 351, an analysis portion 352, a storage portion 361, a control signal generation portion 353, a control portion 354, and the optical filter portion 31.

The reception portion 341 receives the synchronization signals and the parameter signals transmitted using the infrared beams from the display device 2 shown in FIG. 1. The reception portion 341 outputs electrical signals to the detection portion 351 according to the received infrared beams. The reception portion 341 corresponds to the infrared light-receiving element 34 in the hardware configuration shown in FIG. 4.

The detection portion 351 detects the synchronization signals (electrical signals) and the parameter signals (electrical signals) generated from the received infrared beams by the reception portion 341. The synchronization signals and the parameter signals are detected as signals having a prescribed electrical waveform and the like. The detected electrical signals are transmitted to the analysis portion 352, for example, as binary data.

The analysis portion 352 analyzes the signals received by the reception portion 341, and then determines whether they are the synchronization signals or the parameter signals, for example, based on the waveforms of signals received by the reception portion 341. Upon determining that the signal received by the reception portion 341 is the parameter signal, the analysis portion 352 may cause information contained in the parameter signal to be stored in the storage portion 361. The information contained in the parameter signals may relate to, for example, an open time defined as a time period from when the reception portion 341 receives the synchronization signal to when the optical filter portion 31 opens so that the light transmission from the image through the optical filter portion 31 reaches a prescribed value, and a close time defined as a time period from when the reception portion 341 receives the synchronization signal to when the optical filter portion 31 closes so that the light transmission from the image through the optical filter portion 31 reaches a prescribed value. Further, the information contained in the parameter signals may include synchronization signal information defining types of the synchronization signals. The synchronization signal information may include, for example, frequencies of the synchronization signals, frequencies of subcarrier waves for the synchronization signals, a number of pulses in the synchronization signals, a duty ratio of pulse trains of the synchronization signals, and the like.

The analysis portion 352 may compare the signals received by the reception portion 341 with the synchronization signal information stored in the storage portion 361, and then upon determining that the signal received by the reception portion 341 is a specific type of the synchronization signal defined by the synchronization signal information, the analysis portion 352 may store the signal received by the reception portion 341 in the storage portion 361 as the synchronization signal. In this embodiment, the signal determined as the specific type of the synchronization signal defined in the synchronization signal information is transmitted via the storage portion 361 to the control portion 354.

The detection portion 351 and the analysis portion 352 correspond to a portion of the program to be executed by the CPU 35 in the hardware configuration shown in FIG. 4.

As stated above, the storage portion 361 may store the information relating to the open time defined as the time period from when the reception portion 341 receives the synchronization signal to when the optical filter portion 31 opens so that the light transmission from the image through the optical filter portion 31 reaches the prescribed value, the information relating to the close time defined as the time period from when the reception portion 341 receives the synchronization signal to when the optical filter portion 31 closes so that the light transmission from the image through the optical filter portion 31 reaches the prescribed value, the synchronization signal information or any other information, which are included in the parameter signals. Further, the storage portion 361 may store the signals which the analysis portion has determined the specific type of the synchronization signal defined in the synchronization signal information. The storage portion 361 corresponds to the memory 36 in the hardware configuration shown in FIG. 4.

The control signal generation portion 353 generates control signals within the eyeglasses device 3 based on the information (for example, the time at which the reception portion 341 receives the synchronization signal, and the like) contained in the synchronization signals stored in the storage portion 361 and on the above-described information contained in the parameter signals. The control signal generation portion 353 corresponds to the CPU 35 and the clock 37 in the hardware configuration shown in FIG. 4. The control signal generation portion 353 is not an indispensable constituent portion, and so, for example, data may be directly exchanged between the control portion 354 and the analysis portion 352 and/or the storage portion 361, to control the optical filter portion 31.

The control portion 354 controls the actions of the left-eye optical filter 32 and the right-eye optical filter 33 of the eyeglasses device 3 (for example, the control portion 354 may control action to adjust the light transmission through the optical filter portion 31 in synchronization with the switching of the image frames displayed by the display portion 2) based on the control signals or the parameter signals and/or the synchronization signals transmitted from the analysis portion 352. The control portion 354 corresponds to a control program for optical filters which may be executed by the CPU 35 in the hardware configuration shown in FIG. 4.

The optical filter portion 31 comprises a pair of the optical filters 32, 33 configured to adjust the amount of the transmitted light incident on the left eye and the right eye, as stated above. As shown in FIG. 1, the pair of optical filters 32, 33 are mounted on the eyeglasses device 3. The optical filters 32, 33 may include various types of filters to adjust the amount of the transmitted light or to adjust a polarization of the transmitted light and the like. The optical filters 32, 33 may be also filters with liquid crystal elements to be controlled to adjust the light transmission.

In this embodiment, the image displayed by the display device 2 includes the images for the left eye and the right eye, which are alternately switched. The left-eye optical filter 32 and the right-eye optical filter 33 of the optical filter portion 31 may work as a kind of shutters which alternately reduce and increase the light transmission. The action of the optical filter portion 31 is not limited to that of this embodiment. Alternatively, the optical filter portion 31 may change the polarization direction for the right eye and the left eye, respectively. Any types of the optical filters 32, 33 configured to adjust the light transmission in synchronization with the switching of the display of the image frames may be applicable to the optical filter portion 31.

This invention is not limited to the functional configurations shown in FIG. 5 and FIG. 6. For example, in the explanations relating to FIG. 5 and FIG. 6, the transmission portion 221 and display portion 211 are incorporated in the single display device 2, but may instead be separate respective devices. For example, a display device configured to just display the images and a transmission device configured to output and transmit the synchronization signals may be separately prepared as the display device 2.

Moreover, a correspondence relation between the hardware configuration and the functional configurations shown in FIG. 4 through FIG. 6 is merely a specific example used in explanation of the embodiment, and the invention is not limited thereto. Other hardware configurations and other functional configurations may be applicable to the invention.

Figure 7:
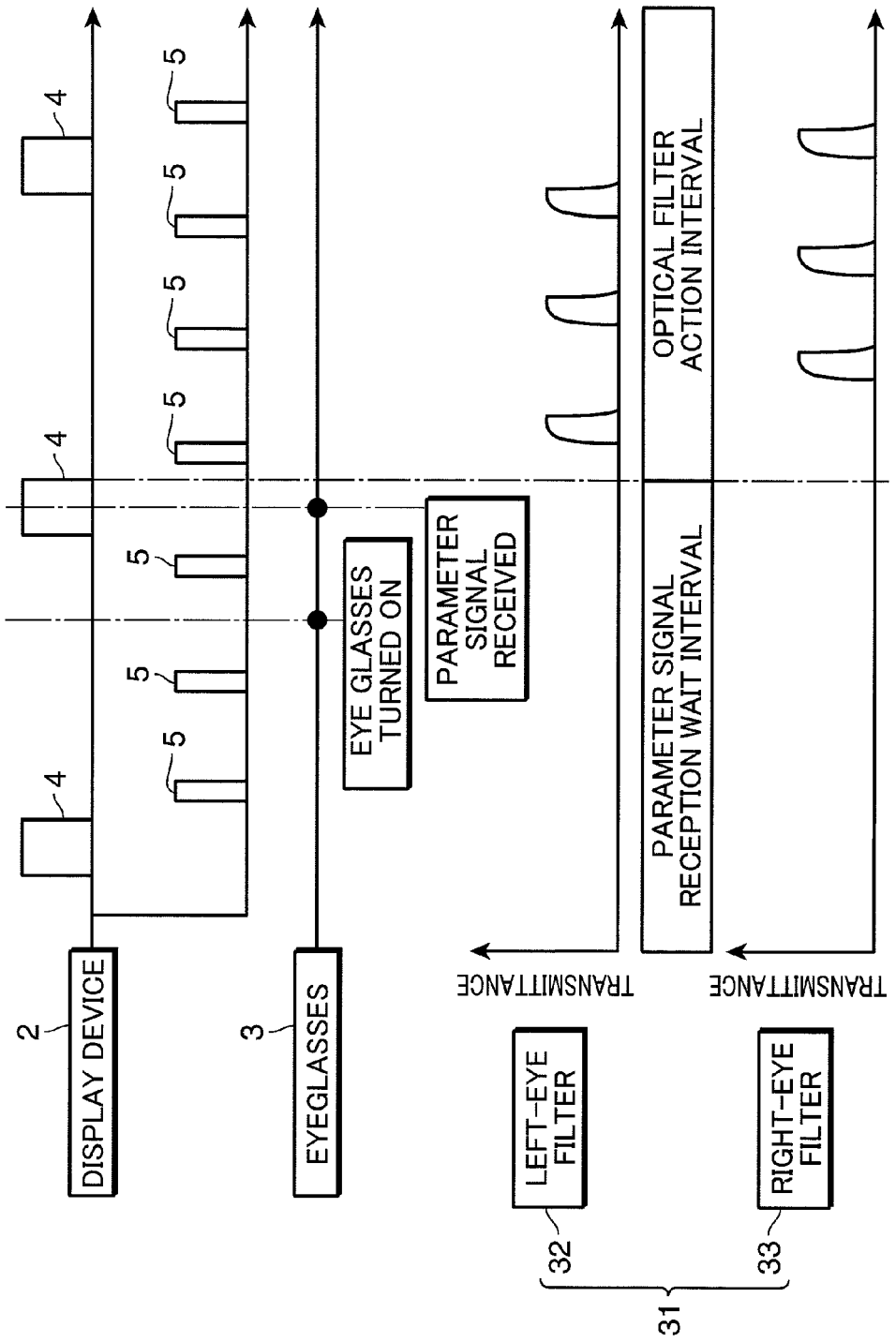
FIG. 7 explains control of the optical filter portion in the image system shown in FIG. 1.

FIG. 7 is a diagram explaining the relations among the parameter signals, the synchronization signals, and the optical filters 32, 33. These relations are explained referring to FIG. 1 and FIGS. 5 to 7.

As stated above, the signal generation portion 243 of the display device 2 generates the parameter signals 4 and the synchronization signals 5. Then, the parameter signals 4 and the synchronization signals 5 are transmitted from the transmission portion 221, under control of the transmission control portion 251, to the reception portion 341 of the eyeglasses device 3. In this embodiment, the parameter signals 4 and the synchronization signals 5 are bit signals formed by combining a plurality of pulse signal waveforms, each of which corresponds to one bit of data; however, the invention is not limited thereto, and signals with other formats capable of communicating information may be used as the parameter signals 4 and the synchronization signals 5. In this embodiment, the transmission portion 221 periodically transmits the parameter signals 4 and the synchronization signals 5.

Before the eyeglasses device 3 is turned on, the amount of the image light transmitted through the left-eye optical filter 32 and the right-eye optical filter 33 may be minimal (for example, transmittance 0%). Until the parameter signals 4 are received after the eyeglasses device 3 is turned on, the optical filter portion 31 does not operate. In FIG. 7, during an interval from when the eyeglasses device 3 is turned on to when the parameter signal 4 is received, one synchronization signal 5 is transmitted from the transmission portion 221, but the light transmission through the left-eye optical filter 32 and the right-eye optical filter 33 is still kept at the minimum. Hence the interval from when the eyeglasses device 3 is turned on to when the first parameter signal 4 is successfully received may be a wait interval to wait for a reception of the first parameter signal 4. In this embodiment, when the viewer operates the power supply switch 302 of the eyeglasses device 3 to turn on the eyeglasses device 3, the internal electrical settings of the eyeglasses device 3 are initialized so that the eyeglasses device 3 is set to wait for the reception of the parameter signal 4. The eyeglasses device 3 under the initialized settings does not accept signals other than the parameter signals 4. Alternatively, the eyeglasses device 3 under the initialized settings does not operate the optical filter portion 31 even when receiving signals other than the parameter signal 4.

When the parameter signal 4 is received via the reception portion 341, the eyeglasses device 3 analyzes the parameter signal 4 using the analysis portion 352 as described above, and stores the information contained in the parameter signal 4 in the storage portion 361. After the successful reception of the parameter signal 4, the optical filter portion 31 performs open/close actions according to the information of the parameter signal 4 stored in the storage portion 361, in response to the receptions of the synchronization signals 5. FIG. 7 shows increases and decreases in the image light transmittance depending on the open/close actions of the left-eye optical filter 32 and right-eye optical filter 33. Hence the interval after the successful reception of the first parameter signal may be defined as an action interval of the optical filter. Here, the light transmission through the left-eye optical filter 32 and the right-eye optical filter 33 is minimal (for example, the transmittance is 0%) before the eyeglasses device 3 is turned on in the above explanation, but the present invention is not limited thereto. For example, the transmittance when the eyeglasses device 3 is turned off may be maximal, or may be greater than any prescribed transmittance. This may depend on properties of the material used in the optical filter portion 31 of the eyeglasses device 3 or other factors. If the liquid crystal elements or the like are used to adjust the transmittance, the transmittance may be lowered when a voltage is applied to the liquid crystal device while the transmittance may raised up when a voltage is not applied to the liquid crystal device.

Figure 8:
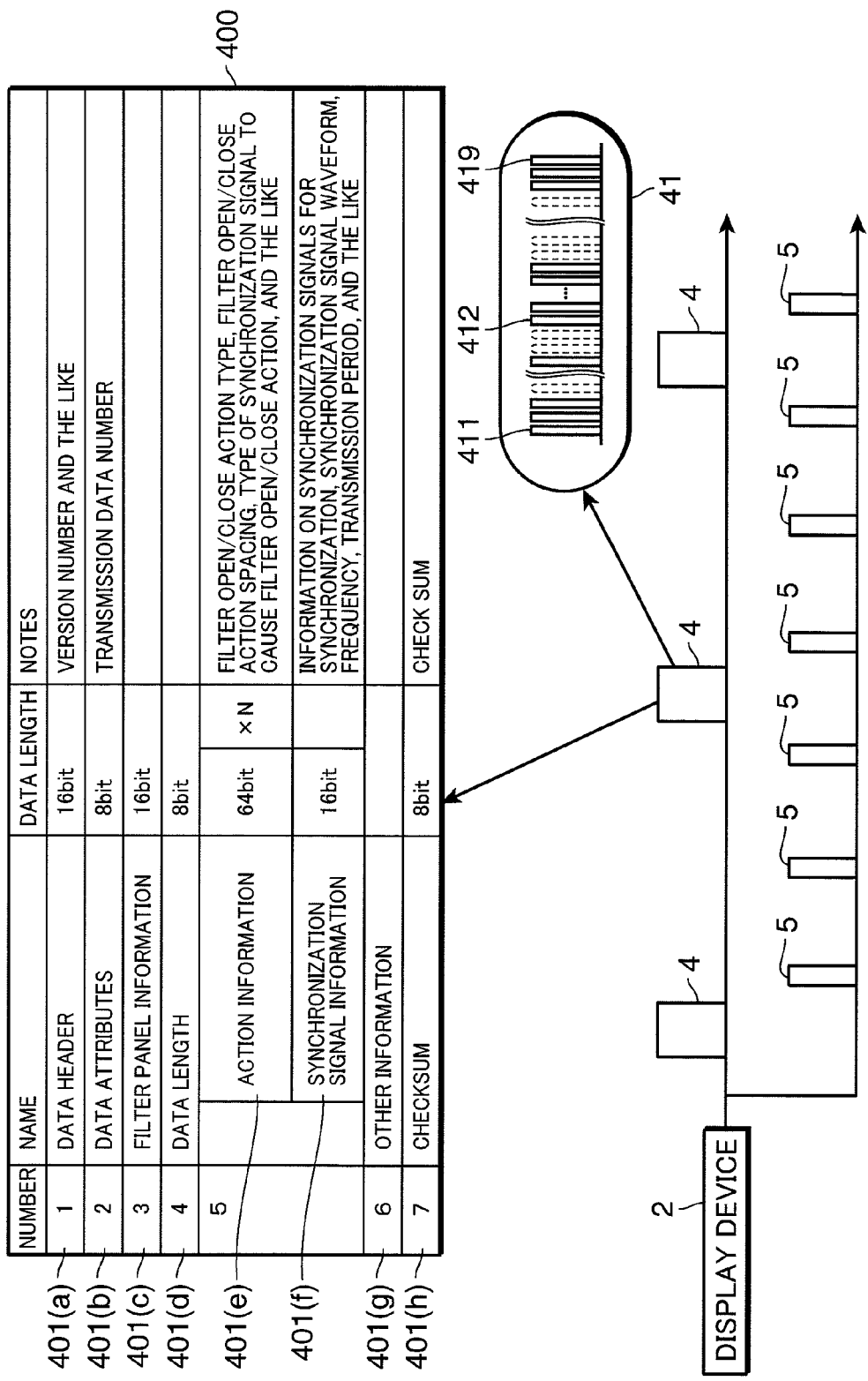
FIG. 8 explains the parameter signals transmitted by the display device in the image system shown in FIG. 1.

FIG. 8 shows an example of the data structure of the information included in the parameter signals 4. This invention is not limited to the data structure shown in FIG. 8, and any other data structure configured to transmit information necessary to operate the optical filter portion 31 shown in FIG. 1 may be used. The information of the parameter signals 4 is explained referring to FIGS. 4 to 6 together with FIG. 8.

As shown in FIG. 8, the parameter signals 4 include bit series 41 to transmit the information, which is required for the action of the optical filter portion 31, from the display device 2 to the eyeglasses device 3. As explained above, in this embodiment the infrared beams are used for the parameter signals 4, but RF signals may also be used alternatively. When using the RF signals, faster information transmission may be achieved than when using the infrared signals. Information indicating start and end of the parameter signals 4 as well as information indicating start and end of data portions 401 (a) through (h) in the data structure 400 shown in FIG. 8 are added to the bit series 41. For example, after the detection portion 351 of the eyeglasses device 3 detects the first bit 411, when three consecutive bits including this first bit 411 are detected, the analysis portion 352 determines that the reception of parameter signals 4 starts. Further, if the analysis portion 352 determines the reception of the parameter signals 4 and if no signals are received during a prescribed time counted by the clock 37 after the final bit 419 among three consecutive bits is received, the analysis portion 352 may determine the reception of the parameter signal 4 is complete. Between the detection of the first bit 411 and the detection of the final bit 419, if two consecutive bits are detected by the detection portion 351 after a two bit interval during which no bits are detected, the analysis portion 352 may determine that one of the data portions 401(a) through (h) starts. After detecting the bit 412 indicating the start of the one of the data portions 401(a) through (h), if no bits are detected over a consecutive two-bit interval after two consecutive bits are detected, the analysis portion 352 may determine that the one of the data portions 401(a) through (h) is complete. The above-described determination for the start and end of the parameter signals 4 as well as for the start and end of each data portions 401(a) through (h) is merely one example, and other methods may be used for these determinations.

The data structure 400 may comprise, for example, data portions 401(a) through (h) such as "data header", "data attributes", "filter panel information", "data length", "action information", "synchronization signal information", "reserved information", "checksum" and so on. The data portion 401(a) indicated as "data header" may include, for example, a version number for the display device 2 or any similar information. The data portion 401(b) indicated as "data attributes" may include, for example, a transmission data number or any similar information. The data portion 401(c) indicated as "filter panel information" may include, for example, information relating to the optical filter portion 31 of the eyeglasses device 3. The data portion 401(d) indicated as "data length" may include, for example, information such as the data lengths of "action information" and "synchronization signal information".

The data portion 401(e) indicated as "action information" may include, for example, information relating to "types of open/close action of the optical filter portion 31", information relating to "time interval between open/close actions of the optical filter portion 31", and information relating to "types of synchronization signals used to cause execution of open/close actions of the optical filter portion 31". For example, these types of information may include information indicating a time from when the synchronization signal 5 is received to when the left-eye optical filter 32 and/or the right-eye optical filter 33 open so that the light transmission of the image reaches 50%; information indicating a time from when the synchronization signal 5 is received to when the left-eye optical filter 32 and/or the right-eye optical filter 33 close so that the light transmission of the image reaches 50%; information indicating a time between start of opening/closing action of the left-eye optical filter 32 and start of opening/closing action of the right-eye filter 33; information relating to the waveform of the synchronization signals 5, the frequency of the synchronization signals 5, the number of pulses in the synchronization signals 5, the duty ratio of pulse trains of the synchronization signals 5, a frequency of a subcarriers of the synchronization signals 5, and the like.

The data portion 401(f) indicated as "synchronization signal information" may include, for example, information relating to "synchronization signals 5 to synchronize the open/close actions of the optical filter portion 31 with the image frames of the display device 2" such as, for example, the waveform, the frequency, and the transmission interval of the synchronization signals 5, the number of the pulses in the synchronization signals 5, the duty ratio of the pulse train of the synchronization signals 5, the frequency of the subcarriers of the synchronization signals 5, and so on.

The data portion 401(g) indicated as "other information" may include other information necessary for the communication between the display device 2 and the eyeglasses device 3 and for the action and/or the control of the optical filter portion 31. The data portion 401(h) indicated as "checksum" may include codes used for checking errors in the communication between the display device 2 and the eyeglasses device 3. The analysis portion 352 may determine whether or not the information in the parameter signals 4 is erroneous based on the codes in the "checksum" data portion 401(h).

Figure 9:
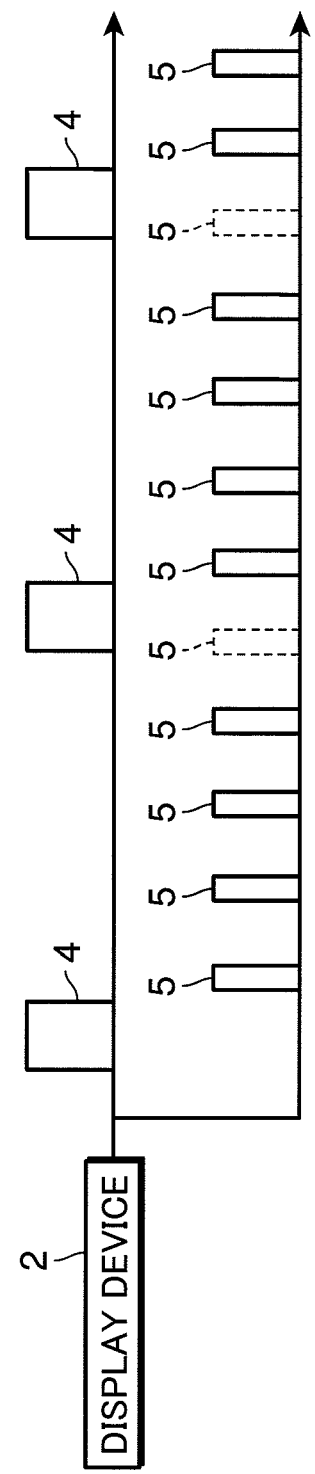
FIG. 9 shows an example of the method for transmitting the parameter signals from the display device in the image system shown in FIG. 1.

FIG. 9 shows the transmission of the parameter signals 4 and the synchronization signals 5 from the display device 2. The transmission of the parameter signals 4 and the synchronization signals 5 from the display device 2 is explained referring to FIG. 5 and FIG. 6 together with FIG. 9.

As explained above, the transmission portion 221 of the display device 2 periodically transmits the parameter signals 4 and the synchronization signals 5. The reception portion 341 of the eyeglasses device 3 periodically receives the parameter signals 4 and the synchronization signals 5. In general, the synchronization signals 5 are transmitted in synchronization with the switching of the image frame displayed by the display portion 211 of the display device 2 while the parameter signals 4 do not have to be transmitted in synchronization with the switching of the image frames. From the standpoint of conserving power in the display device 2 and the eyeglasses device 3, it is preferable that a transmission cycle of the parameter signals 4 is as long as possible. Therefore the transmission cycle of the parameter signals 4 and the transmission cycle of synchronization signals 5 are different. Even when the transmission cycle of the synchronization signals 5 is different from the transmission cycle of the parameter signals 4, the transmission timing of the synchronization signals 5 may coincide with the transmission of the parameter signals 4 (for example, see the synchronization signals 5 indicated by the dashed lines in FIG. 9). At this time, the transmission control portion 251 may control the transmission portion 221 so as to preferentially transmit the parameter signal 4 with halting the transmission of the synchronization signal 5 which is about to be transmitted at the same time as the transmission of the parameter signal 4. Alternatively, the signal generation portion 243 may halt generation of the synchronization signals 5 to be transmitted at the same time as the transmission of the parameter signals 4. As explained above, the control signal generation portion 353 of the eyeglasses device 3 may generate the control signals based on the synchronization signals 5 received prior to the halt of the transmission or the generation of the synchronization signals 5. The control portion 354 may control the optical filter portion 31 based on the control signals. Therefore the halt of the transmission or the generation of the synchronization signals 5 may be less likely to affect the action of the optical filter portion 31.

Figure 10:
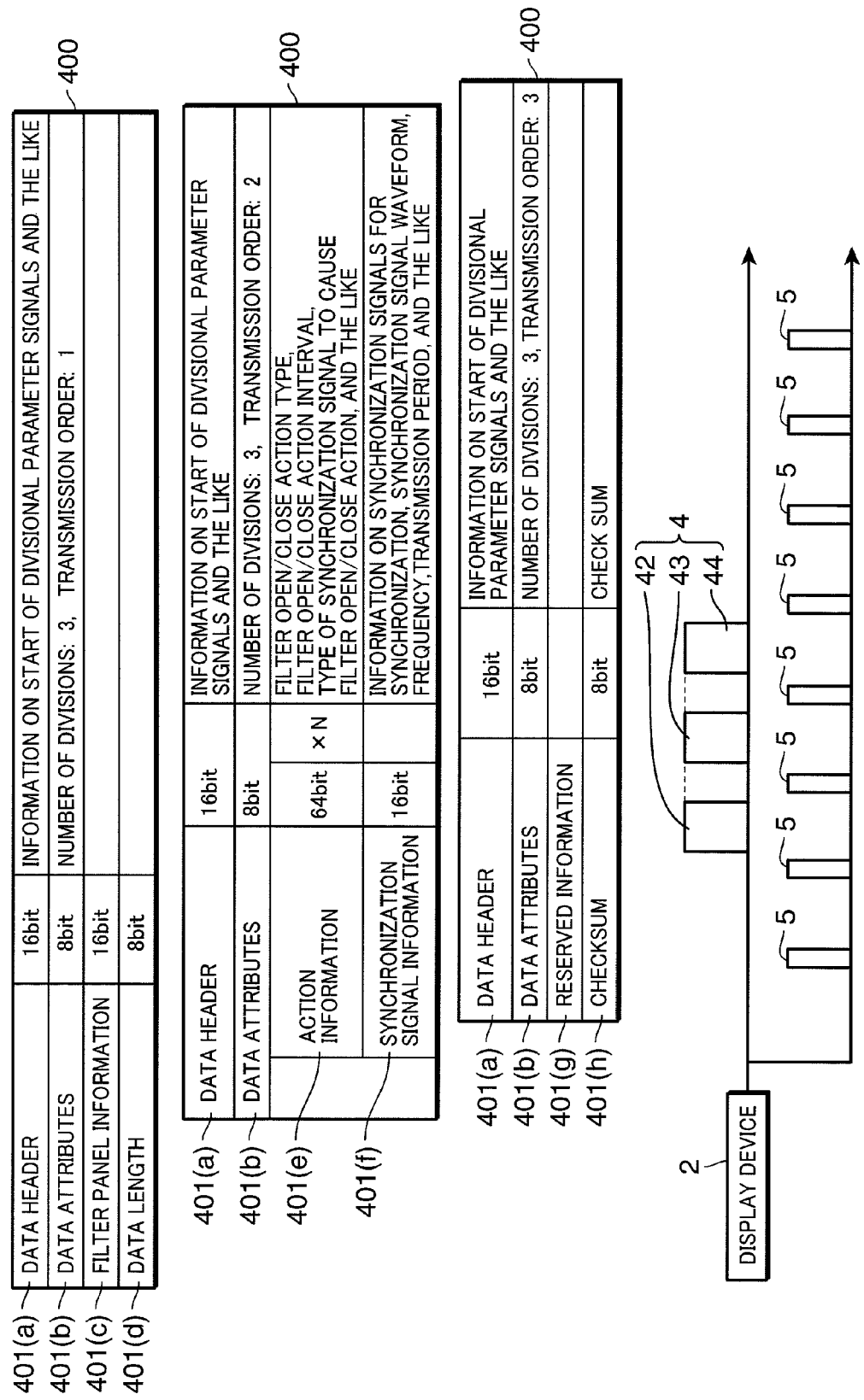
FIG. 10 shows an example of another method for transmitting the parameter signals from the display device in the image system shown in FIG. 1.

FIG. 10 shows an alternative method for the transmission of the parameter signals 4 and the synchronization signals 5 from the display device 2. The alternative method of the transmission of the parameter signals 4 and the synchronization signals 5 from the display device 2 is explained referring to FIG. 5 and FIG. 6 together with FIG. 10.

The parameter signal 4 shown in FIG. 10 is divided into three divisional parameter signals 42, 43, 44. The divisional parameter signals 42, 43, 44 are transmitted in order from the transmission portion 221 with a prescribed time interval therebetween. One synchronization signal 5 is transmitted between the transmissions of the divisional parameter signal 42 and the divisional parameter signal 43, and another synchronization signal 5 is transmitted between transmissions of the divisional parameter signal 43 and the divisional parameter signal 44. By this means, it may not be necessary to halt the transmission or the generation of the synchronization signals 5.

The signal generation portion 243 of the display device 2 may transmit each of the divisional parameter signals 42, 43, 44 including the data structure 400 such as that shown in FIG. 10, for example. The data structure 400 of the divisional parameter signal 42 comprises data portions 401(*a*) through (*d*) including the data for "data header", "data attributes", "filter panel information", and "data length". The data structure 400 of the divisional parameter signal 43 comprises data portions 401(*a*), (*b*), (*e*), and (*f*) including the data for "data header", "data attributes", "action information", and "synchronization signal information". The data structure 400 of the divisional parameter signal 44 comprises data portions 401(*a*), (*b*), (*g*), and (*h*) including the data for "data header", "data attributes", "reserved information", and "checksum".

Information indicating a start of each divisional parameter signals 42, 43, 44 may be incorporated into the "data header" data portions 401(*a*) included in every data structures 400, for example. Information indicating an end of each of divisional parameter signals 42, 43, 44 may be incorporated into each of the data portions 401(*d*), (*f*) and (*h*) at the bottom of each data structure 400. The approach described in the context of FIG. 8 may be similarly applicable to the determination for the start and end of each of the divisional parameter signals 42, 43, 44 as well as the boundaries of each of the data portions 401(*a*) through (*h*).

The total number of the divisional parameter signals 42, 43, 44 divided from one parameter signal 4, the order of the transmission of the divisional parameter signals and other information may be incorporated into the "data attributes" data portions 401(*b*) included in each of the data structures 400, for example. The analysis portion 352 of the eyeglasses device 3 may construct the entire data structure 400, which the parameter signal 4 transmits, based on the divisional number of the parameter signal 4 and the information on the transmission order of the divisional parameter signals 42, 43, 44 included in the "data attributes" data portions 401(*b*). The data structure 400 constructed by the analysis portion 352 is stored in the storage portion 361. The control portion 354 controls the optical filter portion 31 based on the data structure 400 constructed by the analysis portion 352.

As yet another method for preventing an overlap between the transmission timings of the parameter signals 4 and the synchronization signals 5, the parameter signals 4 may be transmitted during vertical blanking intervals at the time of the switching of the image frames displayed by the display portion 211 of the display device 2, or during other intervals in which an image is not displayed by the display portion 211. Further, the signal generation portion 243 may adjust the data length of the parameter signals 4 and the like so that the parameter signals 4 may be transmitted during such intervals. The above-described methods for the transmission of the parameter signals 4 and the synchronization signals 5 are merely examples, and other methods for appropriate transmission and reception of the parameter signals 4 and the synchronization signals 5 may be applicable.

Figure 11:
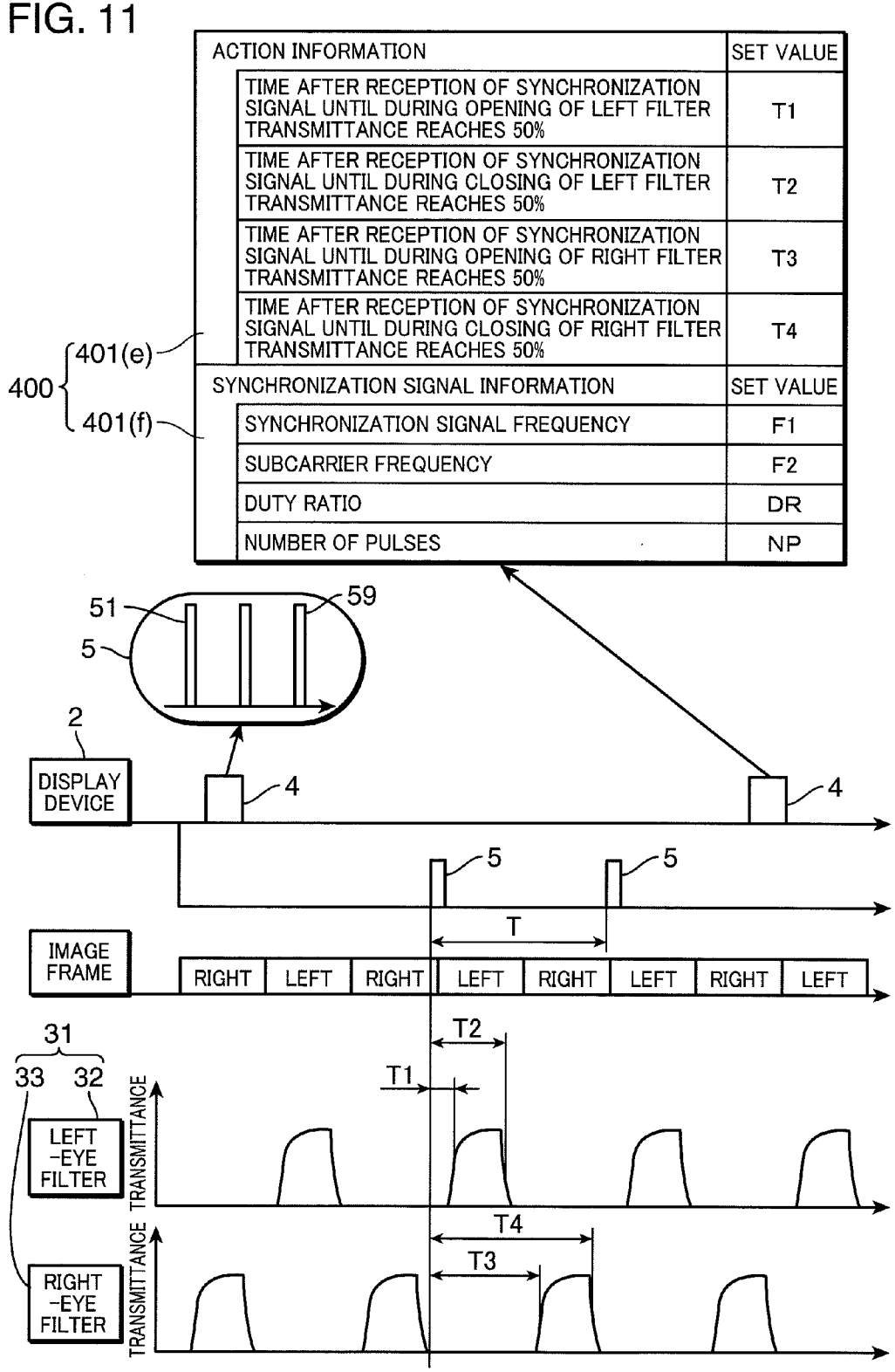
FIG. 11 explains control of the optical filter portion based on the parameter signals and the synchronization signals transmitted from the display device in the image system shown in FIG. 1.

FIG. 11 explains a relation between the information included in the parameter signals 4 and the action of the optical filter portion 31. In FIG. 11, the data portion 401(*e*) for the action information and the data portion 401(*f*) for the synchronization signal information, which are parts of the data structure 400, are shown as the information included in the parameter signals 4. The relation between the information included in the parameter signals 4 and the action of the optical filter portion 31 is explained, referring to FIG. 5 and FIG. 6 together with FIG. 11.

The synchronization signals 5 shown in FIG. 11 are transmitted from the transmission portion 221 of the display device 2 toward the reception portion 341 of the eyeglasses device 3 together with a timing of the switching of the frames for the right-eye images and the left-eye images. Hence the synchronization signals 5 every two frames are transmitted. When there is the overlap of the transmission timing of the parameter signal 4 with the timing of the transmission of the synchronization signal 5, as explained in relation to FIG. 9, the parameter signal 4 is preferentially transmitted while the synchronization signal 5 is not transmitted. One synchronization signal 5 shown in FIG. 11 includes a plurality of the pulse waves.

The data structure 400 relating to the information of the parameter signals 4 shown in FIG. 11 includes a data portion 401(*f*) relating to the synchronization signal information. The data portion 401(*e*) of the synchronization signal information includes information relating to the frequency of the synchronization signals 5, the frequency of the subcarriers of the synchronization signals 5, the duty ratio of the pulse train of the synchronization signals 5, and the number of the pulses in the synchronization signals 5. In FIG. 11, the frequency of the synchronization signals 5 is indicated as "F1", which may be, for example, expressed as a frequency in 0.1 kHz units. When the frequency of the synchronization signals 5 is 36.7 kHz, the frequency may be represented as "0x016F". In FIG. 11, the subcarrier frequency is indicated as "F2", which may be, for example, expressed as a frequency in kHz units. When the subcarrier frequency is, for example, 1.5 MHz, the frequency may be represented as "0x3A98". If the subcarrier is not used, the notation "0" may be used. In FIG. 11, the duty ratio of the pulse train of the synchronization signals 5 is indicated as "DR", which means the ratio of the time from the rising edge of the first pulse wave 51 to the falling edge of the last pulse wave 59 included in the synchronization signal 5, to a time equivalent to a sum of widths of the pulse waves. In units of 1% duty ratio, a 50% duty ratio may be represented as "0x32". In FIG. 11, the number of the pulses is indicated as "NP", which indicates the number of the pulse waves included in one synchronization signal 5. When the single synchronization signal 5 comprises, for example, three pulse waves, "NP" may be represented as "0x03".

The analysis portion 352 of the eyeglasses device 3 reads and analyzes the above-described synchronization signal information from the parameter signals 4, and then stores the information in the storage portion 361. When the reception portion 341 receives a signal, the analysis portion 352 compares the synchronization signal information stored in the storage portion 361 with the characteristics of the received signal (that is, the signal frequency, the signal subcarrier frequency, the duty ratio of the signal pulse train (pulse waves), and the number of the signal pulses). If the characteristics of the signal received by the reception portion 341 coincide with the synchronization signal information stored in the storage portion 361, the analysis portion 352 determines that the signal received by the reception portion 341 is the synchronization signal 5.

The data structure 400 relating to the information of the parameter signal 4 shown in FIG. 11 further comprises a data portion 401(e) relating to the action information which defines the action of the optical filter portion 31. The data portion 401(e) relating to the action information comprises information relating to "a time from when the synchronization signal 5 is received to when the transmittance of the light from the image reaches 50% after the left-eye optical filter 32 starts to open", "a time from when the synchronization signal 5 is received to when the transmittance of the light from the image reaches 50% after the left-eye optical filter 32 starts to close", "a time from when the synchronization signal 5 is received to when the transmittance of the light from the image reaches 50% after the right-eye optical filter 33 starts to open" and "a time from when the synchronization signal 5 is received to when the transmittance of the light from the image reaches 50% after the right-eye optical filter 33 starts to close". In FIG. 11, a time "T1" is set as the information of "the time from when the synchronization signal 5 is received to when the transmittance of the light from the image reaches 50% after the left-eye optical filter 32 starts to open". A time "T2" is set as the information of "the time from when the synchronization signal 5 is received to when the transmittance of the light from the image reaches 50% after the left-eye optical filter 32 starts to close". A time "T3" is set as the information of "the time from when the synchronization signal 5 is received to when the transmittance of the light from the image reaches 50% after the right-eye optical filter 33 starts to open". A time "T4" is set as the information of "the time from when the synchronization signal 5 is received to when the transmittance of the light from the image reaches 50% after the right-eye optical filter 33 starts to close". These times set as "T1", "T2", "T3", "T4" may be represented in microsecond units, or may be represented as time ratios of the transmission period "T" of the synchronization signals 5 (frame time ratios). A "1" or "0" value of a leading bit (MSB bit) of the action information data portion 401(e), for example, may be used as information to be transmitted in order to indicate whether a time notation or a frame time ratio notation is used. In the time notation, the setting value of 1000 μseconds may be, for example, represented by "0x13E8". The setting value for the frame rate at 12.5% may be, for example, represented by "0x007D" (in a case in which units of 0.1% are used).

As explained above, after the analysis portion 352 of the eyeglasses device 3 determines that the signal received by the reception portion 341 is the synchronization signal 5, the control portion 354 controls the optical filter portion 31 based on the action information stored in the storage portion 361 by the analysis portion 352, or according to the control signal generated by the control signal generation portion 353 based on the action information. As shown in FIG. 11, the left-eye optical filter 32 opens under control of the control portion 354 such that the transmittance of 50% is obtained the time "T1" after the reception of the synchronization signal 5. After obtaining the maximum transmittance, the left-eye optical filter 32 closes such that the transmittance of 50% is obtained the time "T2" after the reception of the synchronization signal 5. Similarly, the right-eye optical filter 33 opens under control of the control portion 35 such that the transmittance of 50% is obtained the time "T3" after the reception of the synchronization signal 5. After obtaining the maximum transmittance, the right-eye optical filter 33 closes such that the transmittance of 50% is obtained the time "T4" after the reception of the synchronization signal 5. In this way, it is not necessary to send the synchronization signals 5 every image frame because the parameter signal 4 includes the information relating to the actions of the left-eye optical filter 32 and the right-eye optical filter 33 (the action information). Thus a required power for the communication between the display device 2 and the eyeglasses device 3 may go down well.

Figure 12:
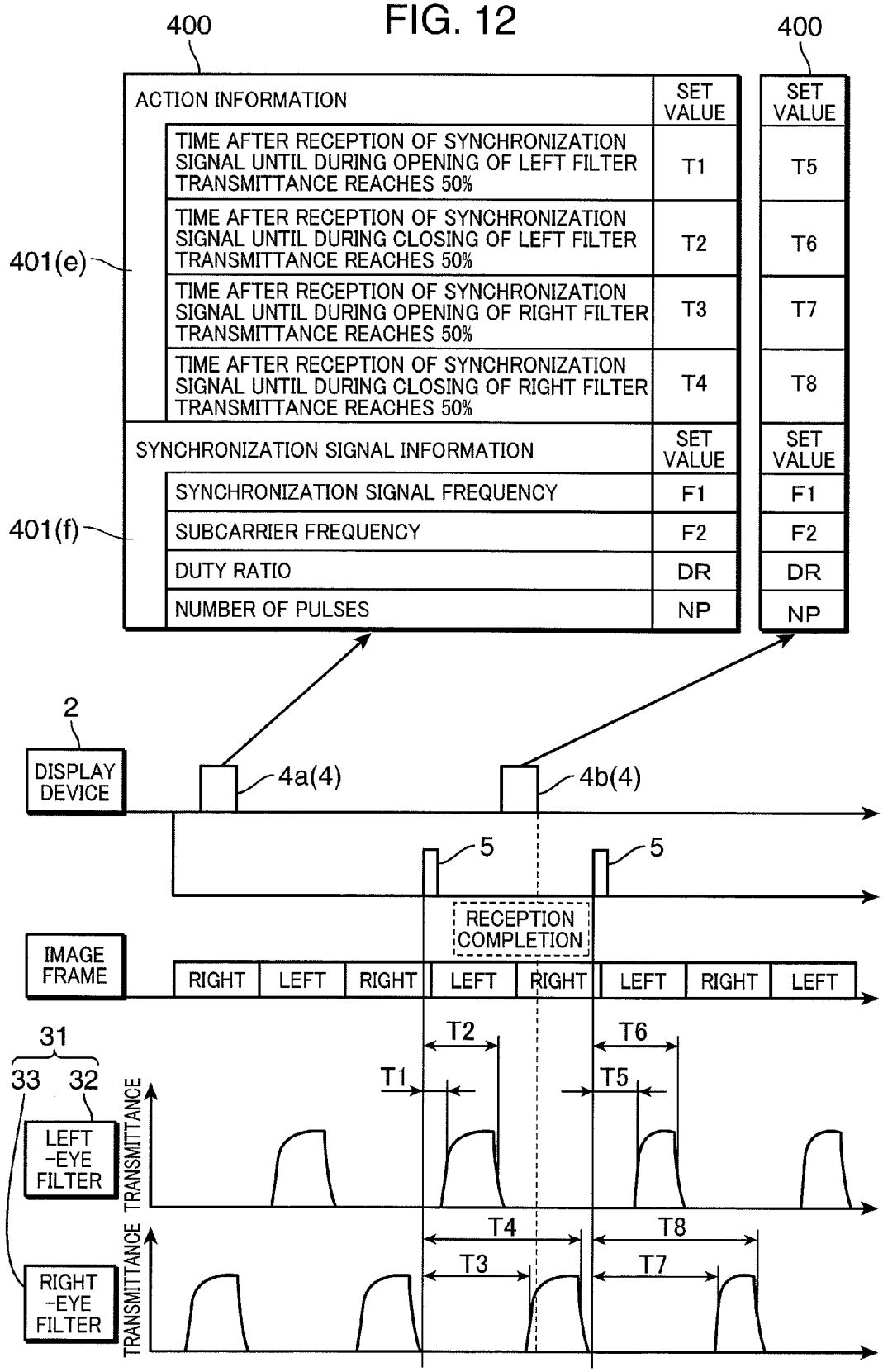
FIG. 12 explains control of the optical filter portion based on the parameter signals and the synchronization signals transmitted from the display device in the image system shown in FIG. 1.

FIG. 12 explains a method for changing the action of the optical filter portion 31 using the parameter signal 4 while the display device 2 displays the images. In FIG. 12, the data portion 401(e) for the action information and the data portion 401(f) for the synchronization signal information, which are portions of the data structure 400, are shown as the information included in the parameter signal 4. The method for changing the action of the optical filter portion 31 using the parameter signal 4 is explained referring to FIG. 5 and FIG. 6 together with FIG. 12.

There are two parameter signals 4 in FIG. 12. A symbol 4a is assigned to the parameter signal 4 which is first generated, and a symbol 4b is assigned to the parameter signal 4 which is generated afterward. The parameter signal 4a and the parameter signal 4b comprise a data structure 400, respectively. Each of the data structures 400 comprises the action information data portion 401(e) and the synchronization signal information data portion 401(f). The synchronization signals 5 shown in FIG. 5 are constant while the display device 2 displays the images. Therefore the settings for the synchronization signal information data portion 401(f) in the parameter signal 4a are equal to the settings for the synchronization signal information data portion 401(f) in the parameter signal 4b. On the other hand, the settings for the action information data portion 401(e) of the parameter signal 4a and the settings for the action information data portion 401(e) of the parameter signal 4b are different. In the data structure 400 of the parameter signal 4a, the time "T1" is set as the information of "the time from when the synchronization signal 5 is received to when the transmittance of the light from the image reaches 50% after the left-eye optical filter 32 starts to open", whereas in the data structure 400 of the parameter signal 4b, a time "T5" different from the time "T1" is set. In the data structure 400 of the parameter signal 4a, the time "T2" is set as the information of "the time from when the synchronization signal 5 is received to when the transmittance of the light from the image reaches 50% after the left-eye optical filter 32 starts to close", whereas in the data structure 400 of the parameter signal 4b, a time "T6" different from the time "T2" is set. In the data structure 400 of the parameter signal 4a, the time "T3" is set as the information of "the time from when the synchronization signal 5 is received to when the transmittance of the light from the image reaches 50% after the right-eye optical filter 33 starts to open" whereas in the data structure 400 of the parameter signal 4b, a time "T7" different from the time "T3" is set. In the data structure 400 of the parameter signal 4a, the time "T4" is set as the information of "the time from when the synchronization signal 5 is received to when the transmittance of the light from the image reaches 50% after the right-eye optical filter 33 starts to close" whereas in the data structure 400 of the parameter signal 4b, a time "T8" different from the time "T4" is set.

The control portion 354 of the eyeglasses device 3 controls the optical filter portion 31 based on the previously transmitted parameter signal 4 before the analysis portion 352 determines that the reception of another parameter signal 4 is complete. The approach explained in the context of FIG. 8 may be used to determine whether the reception of the parameter signal 4 is complete.

Before the reception of the parameter signal 4b is complete, the optical filter portion 31 is controlled according to the action information of the parameter signal 4a. Therefore as shown in FIG. 12, the left-eye optical filter 32 is opened under control of the control portion 354 such that the transmittance of 50% is obtained the time "T1" after the reception of the synchronization signal 5. After obtaining the maximum transmittance, the left-eye optical filter 32 is closed such that the transmittance of 50% is obtained the time "T2" after the reception of the synchronization signal 5. Similarly, the right-eye optical filter 33 is opened under control of the control portion 354 such that the transmittance of 50% is obtained the time "T3" after the reception of the synchronization signal 5. After obtaining the maximum transmittance, the right-eye optical filter 33 is closed such that the transmittance of 50% is obtained the time "T4" after the reception of the synchronization signal 5.

After the reception of the parameter signal 4b is complete, the optical filter portion 31 is controlled according to the action information of the parameter signal 4b. Therefore as shown in FIG. 12, the left-eye optical filter 32 opens under control of the control portion 354 such that the transmittance of 50% is obtained the time "T5" after the reception of the synchronization signal 5. After obtaining the maximum transmittance, the left-eye optical filter 32 closes such that the transmittance of 50% is obtained the time "T6" after the reception of the synchronization signal 5. Similarly, the right-eye optical filter 33 opens under control of the control portion 354 such that the transmittance of 50% is obtained the time "T7" after the reception of the synchronization signal 5. After obtaining the maximum transmittance, the right-eye optical filter 33 closes such that the transmittance of 50% is obtained the time "T8" after the reception of the synchronization signal 5.

In this way, the change in the timing of the open/close actions of the optical filter portion 31 while the display device 2 displays the images may follow, for example, changes in the image display characteristics resulting from changes in a temperature of the liquid crystals. Alternatively if a long afterglow from the left-eye image frame is anticipated (for example, in a case that bright spots are represented in a generally dark image), setting back the opening timing of the optical filter 32 or 33 with respect to the subsequent image frame may decrease an effect of the afterglow from the preceding image frame.

Figure 13:
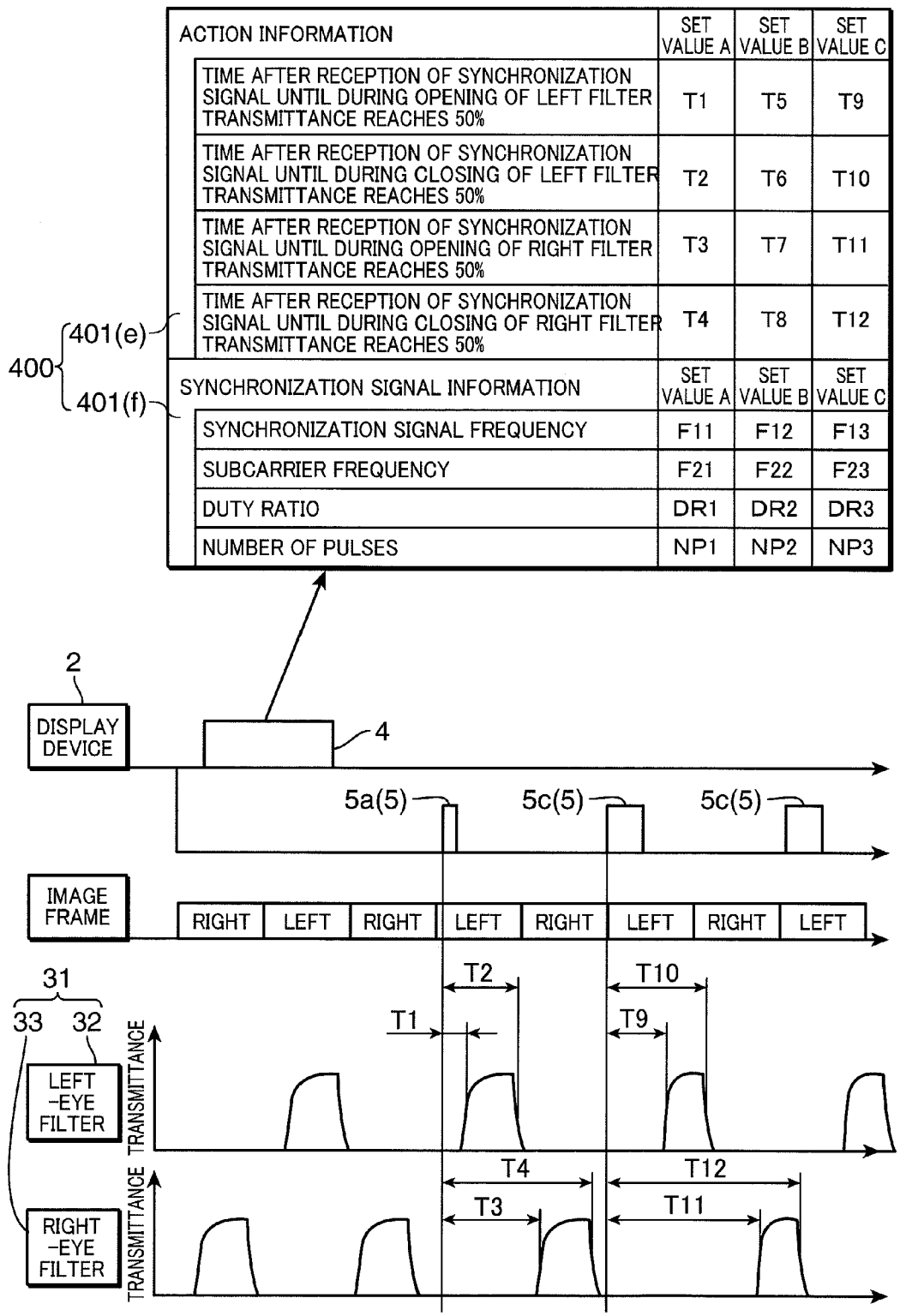
FIG. 13 explains control of the optical filter portion based on the parameter signals and the synchronization signals transmitted from the display device in the image system shown in FIG. 1.

FIG. 13 explains a method for changing the action of the optical filter portion 31 using the parameter signals 4 and the synchronization signals 5 while the display device 2 displays the images. In FIG. 13, the action information data portion 401(e) and the synchronization signal information data portion 401(f), which are portions of the data structure 400, are shown as the information included in the parameter signal 4. The method for changing the action of the optical filter portion 31 using the parameter signals 4 and the synchronization signals 5 is explained referring to FIG. 5 and FIG. 6 together with FIG. 13.

In the parameter signal 4 shown in FIG. 13, three different settings are provided for the information of "the time from when the synchronization signal 5 is received to when the transmittance of the light from the image reaches 50% after the left-eye optical filter 32 starts to open", "the time from when the synchronization signal 5 is received to when the transmittance of the light from the image reaches 50% after the left-eye optical filter 32 starts to close", "the time from when the synchronization signal 5 is received to when the transmittance of the light from the image reaches 50% after the right-eye optical filter 33 starts to open" and "the time from when the synchronization signal 5 is received to when the transmittance of the light from the image reaches 50% after the right-eye optical filter 33 starts to close". The settings listed in each column indicated as "SET VALUE A", "SET VALUE B" and "SET VALUE C" is one group. For example, when the reception portion 341 of the eyeglasses device 3 receives the synchronization signal 5a with the characteristics of the settings listed in the column "SET VALUE A" in the synchronization signal information data portion 401(f), the optical filter portion 31 operates according to the settings indicated in the column "SET VALUE A" in the action information data portion 401(e). Similarly, when the reception portion 341 of the eyeglasses device 3 receives the synchronization signal 5b with the characteristics of the settings listed in the column "SET VALUE B" in the synchronization signal information data portion 401(f), the optical filter portion 31 operates according to the settings indicated in the column "SET VALUE B" in the action information data portion 401(e). Also when the reception portion 341 of the eyeglasses device 3 receives the synchronization signal 5c with the characteristics of the settings listed in the column "SET VALUE C" in the synchronization signal information data portion 401(f), the optical filter portion 31 operates according to the settings indicated in the column "SET VALUE C" in the action information data portion 401(e).

There are the synchronization signal 5a described in the "SET VALUE A" column shown in the synchronization signal information data portion 401(f) and the synchronization signal 5c described in the "SET VALUE C" column shown in the synchronization signal information data portion 401(f). When the synchronization signal 5a is received, the left-eye optical filter 32 opens under control of the control portion 354 such that the transmittance of 50% is obtained the time "T1" after the reception of the synchronization signal 5a. After obtaining the maximum transmittance, the left-eye optical filter 32 closes such that the transmittance of 50% is obtained the time "T2" after the reception of the synchronization signal 5a. Similarly, the right-eye optical filter 33 opens under control of the control portion 354 such that the transmittance of 50% is obtained the time "T3" after the reception of the synchronization signal 5a. After obtaining the maximum transmittance, the right-eye optical filter 33 closes such that the transmittance of 50% is obtained the time "T4" after the reception of the synchronization signal 5a. Similarly, when the synchronization signal 5c is received, the left-eye optical filter 32 opens under control of the control portion 354 such that the transmittance of 50% is obtained the time "T9" after the reception of the synchronization signal 5c. After obtaining the maximum transmittance, the left-eye optical filter 32 closes such that the transmittance of 50% is obtained the time "T10" after the reception of the synchronization signal 5c. Similarly, the right-eye optical filter 33 opens under control of the control portion 354 such that the transmittance of 50% is obtained the time "T11" after the reception of the synchronization signal 5c. After obtaining the maximum transmittance, the right-eye optical filter 33 closes such that the transmittance of 50% is obtained the time "T12" after the reception of the synchronization signal 5c.

In this way, the action of the optical filter portion 31 may be changed using the single parameter signal 4 including various types of the information relating to the open times and/or the close times of the optical filter portions 31 of the eyeglasses devices 3 as well as various synchronization signal information corresponding to the various types of the information if the signal generation portion 243 generates a plurality of the synchronization signals 5 according to the plurality of the various synchronization signal information values included in the parameter signal 4 while the display device 2 displays the images.

Figure 14:
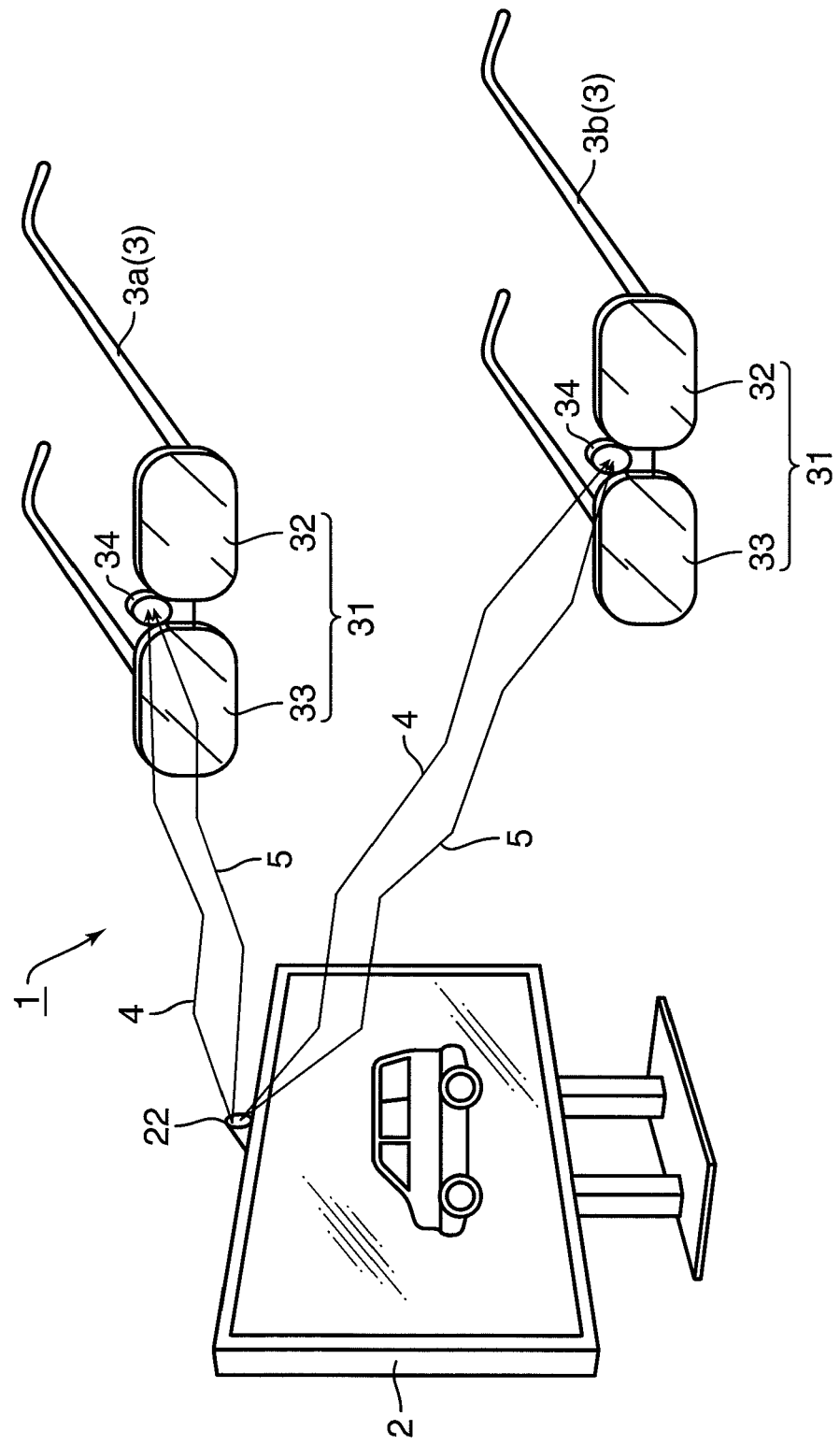
FIG. 14 schematically shows another image system according to one embodiment of the invention.

FIG. 14 shows an image system comprising two eyeglasses devices 3 and one display device 2. In FIG. 14, a symbol "3a" is assigned to one of the eyeglasses devices 3 and another symbol "3b" is assigned to the other eyeglasses device 3. The synchronization signals 5 and the parameter signals 4 are transmitted from the infrared light-emitting element 22 of the display device 2, and the infrared light-receiving elements 34 of the eyeglasses devices 3a, 3b receive these signals. The optical filter portions 31 of the eyeglasses devices 3a, 3b are controlled based on the synchronization signals 5 and the parameter signals 4 received by the infrared light-receiving elements 34.

Figure 15:
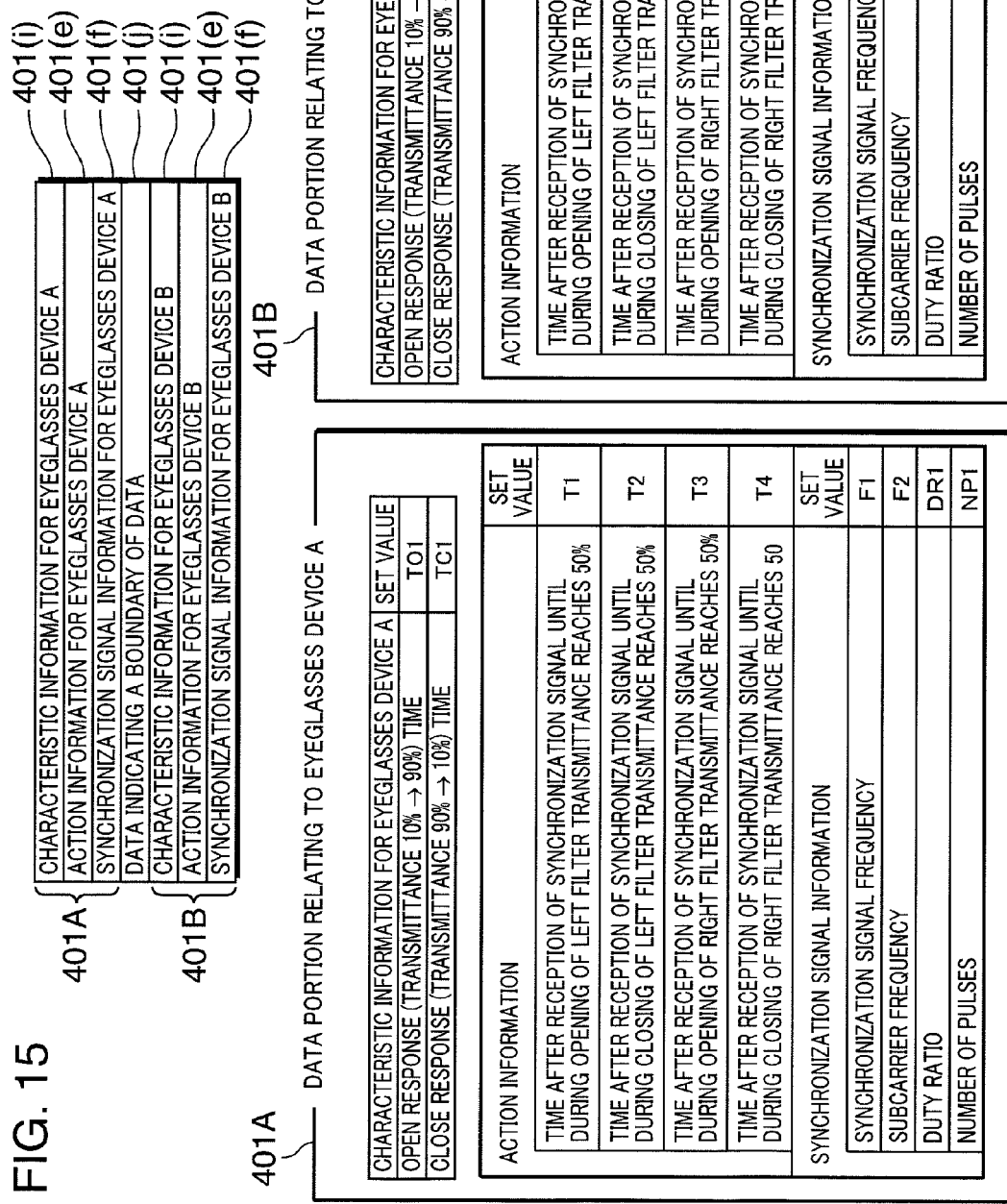
FIG. 15 shows an example of a data structure included in the parameter signals used in the image system shown in FIG. 14.

FIG. 15 shows the data structure 400 of the parameter signals 4 preferably used in the image system 1 shown in FIG. 14. The data structure 400 is explained referring to FIG. 5, FIG. 6, and FIG. 14 together with FIG. 15.

The data structure 400 shown in FIG. 15 comprises data portions 401A and 401B provided for two eyeglasses devices 3 (an eyeglasses device A and an eyeglasses device B) with different response characteristics. The data portion 401A provided for the eyeglasses device A comprises a data portion 401(i) for characteristic information of the eyeglasses device A, a data portion 401(e) for the action information of the eyeglasses device A and the synchronization signal information 401(f) for the eyeglasses device A. The data portion 401B provided for the eyeglasses device B comprises a data portion 401(i) for characteristic information of the eyeglasses device B, a data portion 401(e) for the action information of the eyeglasses device B and the synchronization signal information 401(f) for the eyeglasses device B. The data portions 401(e), (f) and (i) included in the data portion 401A and the data portion 401B are mutually associated. The respective data portions 401(i) for the characteristic information of the eyeglasses device A and eyeglasses device B may comprise, for example, the response time when opening the optical filter portion 31 of the eyeglasses device A and the eyeglasses device B (the time required for the transmittance of the image light to increase from 10% to 90%), and the response time when closing the optical filter portion 31 of the eyeglasses device A and the eyeglasses device B (the time required for the transmittance of the image light to decrease from 90% to 10%). In FIG. 15, the setting "TO1" is allocated for the response time when opening the optical filter portion 31 of the eyeglasses device A, and the setting "TC1" is allocated for the response time when closing the optical filter portion 31 of the eyeglasses device A. Also, the setting "TO2" different from the setting "TO1" is allocated for the response time when opening the optical filter portion 31 of the eyeglasses device B, and the setting "TC2" different from the setting "TC1" is allocated for the response time when closing the optical filter portion 31 of the eyeglasses device B. Information on the response characteristics of the eyeglasses devices 3 currently marketed or to be marketed, for example, may be incorporated into the data portions 401(i) indicating information about the characteristics of the eyeglasses devices A and B.

The respective response characteristics are stored in the storage portions 361 of the eyeglasses devices 3a, 3b shown in FIG. 14. For example, the storage portion 361 of the eyeglasses device 3a may store the value "TO1" as the time required for the transmittance of the image light to increase from 10% to 90% and the value "TC1" as the time required for the transmittance of the image light to decrease from 90% to 10%. The storage portion 361 of the eyeglasses device 3b may store the value "TO2" as the time required for the transmittance of the image light to increase from 10% to 90% and the value "TC2" as the time required for the transmittance of the image light to decrease from 90% to 10%. The above-mentioned values of the transmittance defining the response times are just exemplarily defined. Therefore the embodiment is in no way limited to these transmittance values, and other transmittance values may be defined.

The respective analysis portions 352 of the eyeglasses devices 3a, 3b read the characteristic information of the eyeglasses device A and eyeglasses device B included in the data portion (i) of the parameter signal 4, and also read the response characteristic data stored in the storage portions 361, so that the respective analysis portions 352 of the eyeglasses devices 3a, 3b compare the characteristic information with the response characteristic data. The analysis portions 352 identifies which the data portion 401A or B of the parameter signal 4 has the characteristic information closest to the response characteristic data stored in advance in the storage portion 361. The response characteristic data stored in the storage portion 361 of the eyeglasses device 3a shown in FIG. 14 coincides with the response characteristic information set for eyeglasses device A. Also the response characteristic data stored in the storage portion 361 of the eyeglasses device 3b shown in FIG. 14 coincides with the response characteristic information set for eyeglasses device B. Therefore the analysis portion 352 of the eyeglasses device 3a determines that the information associated with the eyeglasses device A is to be used to control the optical filter portion 31 of the eyeglasses device 3a. Also, the analysis portion 352 of the eyeglasses device 3b determines that the information associated with the eyeglasses device B is to be used to control the optical filter portion 31 of the eyeglasses device 3b.

As explained above, the data portion 401(*i*) of "the information indicating the characteristics for eyeglasses device A" is associated with the data portion 401(*e*) of "the action information for eyeglasses device A" and with the data portion 401(*f*) of "the synchronization signal information for the eyeglasses device A". Similarly, the data portion 401(*i*) is associated with the data portion 401(*e*) of "the action information for the eyeglasses device B" and with the data portion 401(*f*) of "the synchronization signal information for eyeglasses device B". The data portion 401(*e*) of "the action information for eyeglasses device A" includes the action information set for the eyeglasses device A. The data portion 401(*f*) of "the synchronization signal information for the eyeglasses device A" includes the synchronization signal information set for the eyeglasses device A. Similarly, the data portion 401(*e*) of "the action information for the eyeglasses device B" includes the action information set for the eyeglasses device B. The data portion 401(*f*) of "the synchronization signal information for eyeglasses device B" includes the synchronization signal information set for the eyeglasses device B. The information included in the data portion 401A associated with the eyeglasses device A is different from the information included in the data portion 401B associated with the eyeglasses device B. The analysis portion 352 of the eyeglasses device 3*a* reads the portion 401(*e*) of "the action information for eyeglasses device A" and the data portion 401(*f*) of "the synchronization signal information for the eyeglasses device A" and stores their information in the storage portion 361 of the eyeglasses device 3*a*. The analysis portion 352 of the eyeglasses device 3*b* reads the data portion 401(*e*) of "the action information for the eyeglasses device B" and the data portion 401(*f*) of "the synchronization signal information for eyeglasses device B" and stores their information in the storage portion 361 of the eyeglasses device 3*b*. In FIG. 15, a data portion 401(*j*) of "data indicating a boundary of data" is incorporated between the data portion 401A associated with the eyeglasses device A and the data portion 401B associated with the eyeglasses device B. The analysis portions 352 of the eyeglasses devices 3*a*, 3*b* may use the data portion 401(*j*) of "data indicating a boundary of data", as the approach explained in the context of FIG. 8, to identify an end of the data portion 401A associated with the eyeglasses device A and a beginning of the data portion 401B associated with the eyeglasses device B.

Figure 16:
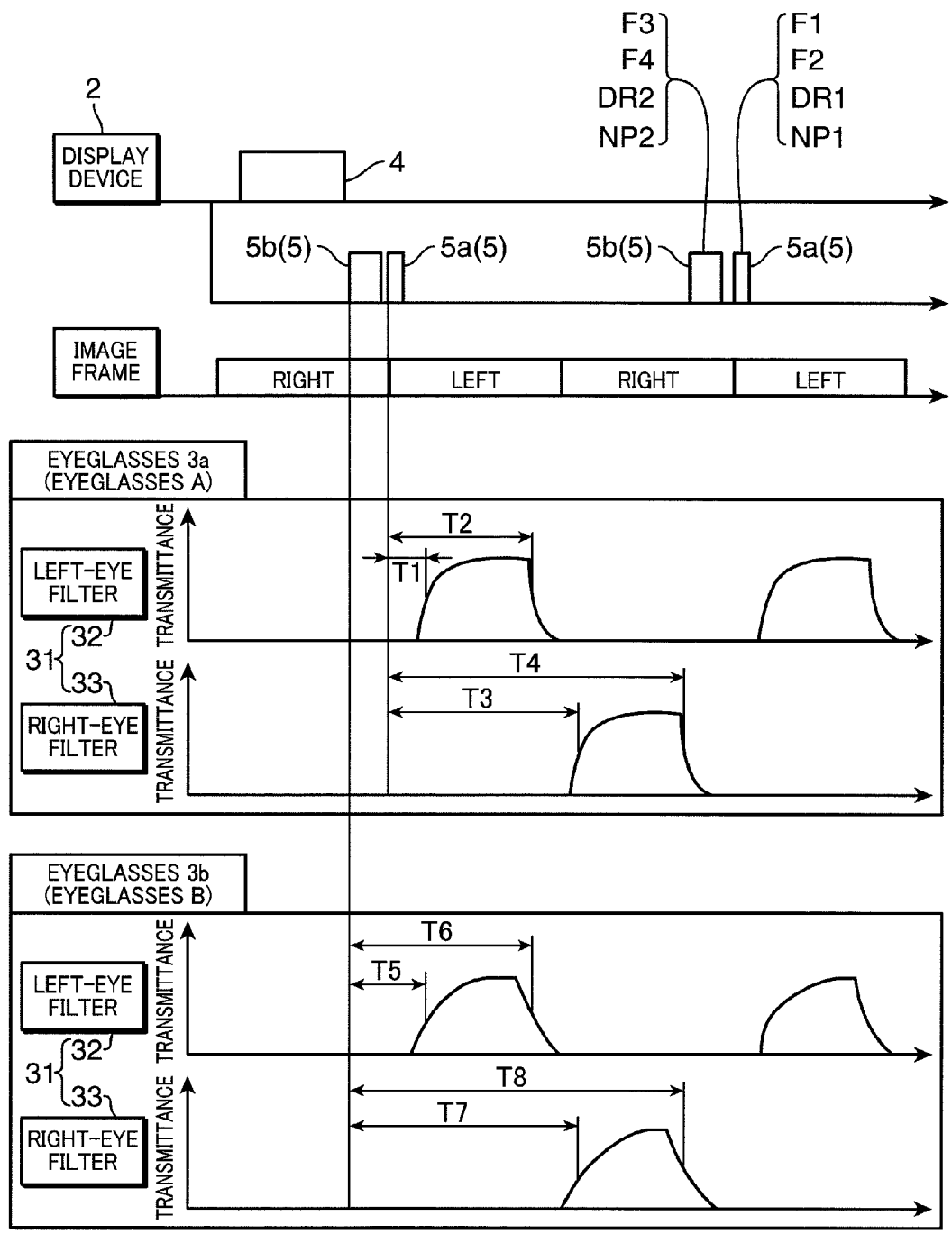
FIG. 16 explains control of the optical filter portion based on the parameter signals and the synchronization signals transmitted from the display device in the image system shown in FIG. 14.

FIG. 16 explains a control of the eyeglasses device 3 in the image system 1 shown in FIG. 14. The control of the eyeglasses device 3 of the image system 1 is explained referring to FIG. 5, FIG. 6 and FIGS. 14 to 16.

As shown in FIG. 16, the transmission portion 221 of the display device 2 transmits two types of the synchronization signals 5 after transmitting the parameter signal 4. The synchronization signal to which a symbol 5*a* is assigned is generated according to the settings included in the data portion 401(*f*) of "the synchronization signal information" within the data portion 401A relating to the eyeglasses device A shown in FIG. 15. The synchronization signal to which a symbol 5*b* is assigned is generated according to the settings included in the data portion 401(*f*) of "the synchronization signal information" within the data portion 401B relating to the eyeglasses device B shown in FIG. 15.

The analysis portion 352 of the eyeglasses device 3*a* compares the synchronization signal information stored in the storage portion 361 of the eyeglasses device 3*a* when the parameter signal 4 is received with the characteristics of the synchronization signals 5*a* and 5*b* received by the reception portion 341 of the eyeglasses device 3*a*. As the result of the comparison, the analysis portion 352 of the eyeglasses device 3*a* ignores the synchronization signal 5*b*, and determines the synchronization signal 5*a* to be the synchronization signal 5 to be used in controlling the optical filter portion 31 of the eyeglasses device 3*a*. The control signal generation portion 353 of the eyeglasses device 3*a* generates the control signals based on the action information of the data portion 401(*e*) for the eyeglasses device A stored in the storage portion 361 of the eyeglasses device 3*a* when the parameter signal 4 is received as well as the synchronization signal 5*a* determined by the analysis portion 352 to be the synchronization signal 5 to be used in the control. The control portion 354 of the eyeglasses device 3*a* executes the control of the optical filter portion 31 based on the control signals. Alternatively, the control portion 354 of the eyeglasses device 3*a* may execute the control of the optical filter portion 31 based on the action information of the data portion 401(*e*) for the eyeglasses device A stored in the storage portion 361 as well as the synchronization signal 5*a* transmitted from the analysis portion 352.

The left-eye optical filter 32 of the eyeglasses device 3*a* opens under control of the control portion 354 in the eyeglasses device 3*a* such that the image light transmittance reaches 50% the time "T1" after the reception of the synchronization signal 5*a*. After the maximum transmittance is reached, the left-eye optical filter 32 closes such that the image light transmittance reaches 50% the time "T2" after the reception of the synchronization signal 5*a*.

The right-eye optical filter 33 of the eyeglasses device 3*a* opens under control of the control portion 354 in the eyeglasses device 3*a* such that the image light transmittance reaches 50% the time "T3" after the reception of the synchronization signal 5*a*. After the maximum transmittance is reached, the right-eye optical filter 33 closes such that the image light transmittance reaches 50% the time "T4" after the reception of the synchronization signal 5*a*.

The analysis portion 352 of the eyeglasses device 3*b* compares the synchronization signal information stored in the storage portion 361 of the eyeglasses device 3*b* when the parameter signal 4 is received with the characteristics of the synchronization signals 5*a* and 5*b* received by the reception portion 341 of the eyeglasses device 3*b*. As the result of the comparison, the analysis portion 352 of the eyeglasses device 3*b* ignores the synchronization signal 5*a*, and determines the synchronization signal 5*b* to be the synchronization signal 5 to be used in controlling the optical filter portion 31 of the eyeglasses device 3*b*. The control signal generation portion 353 of the eyeglasses device 3*b* generates the control signals based on the action information included in the data portion 401(*e*) for the eyeglasses device B stored in the storage portion 361 of the eyeglasses device 3*b* when the parameter signal 4 is received as well as the synchronization signal 5*b* determined by the analysis portion 352 to be the synchronization signal 5 to be used in the control. The control portion 354 of the eyeglasses device 3*b* executes the control of the optical filter portion 31 based on the control signals. Alternatively, the control portion 354 of the eyeglasses device 3*b* may execute the control of the optical filter portion 31 based on the action information of the data portion 401(*e*) for the eyeglasses device B stored in the storage portion 361 as well as the synchronization signal 5*b* transmitted from the analysis portion 352.

The left-eye optical filter 32 of the eyeglasses device 3*b* opens under control of the control portion 354 of the eyeglasses device 3*b* such that the image light transmittance reaches 50% the time "T5" after the reception of the synchronization signal 5*b*. After the maximum transmittance is reached, the left-eye optical filter 32 closes such that the image light transmittance reaches 50% the time "T6" after the reception of the synchronization signal 5b.

The right-eye optical filter 33 of the eyeglasses device 3b opens under control of the control portion 354 of the eyeglasses device 3b such that the image light transmittance reaches 50% the time "T7" after the reception of the synchronization signal 5b. After the maximum transmittance is reached, the right-eye optical filter 33 closes such that the image light transmittance reaches 50% the time "T8" after the reception of the synchronization signal 5b.

As shown in FIG. 16, the left-eye optical filter 32 of the eyeglasses device 3b reaches the transmittance of 50% (during the open/close action) at the same time as the left-eye optical filter 32 of the eyeglasses device 3a reaches the transmittance of 50% (during the open/close action). Similarly, the right-eye optical filter 33 of the eyeglasses device 3b reaches the transmittance of 50% (during the open/close action) at the same time as the right-eye optical filter 33 of the eyeglasses device 3a reaches the transmittance of 50% (during the open/close action). In this way, it is preferable that the transmission control portion 251 of the display device 2 control the timing of the transmission of synchronization signals 5 from the transmission portion 221 based on the information included in the parameter signals 4 generated by the signal generation portion 243, such that the two eyeglasses devices 3a, 3b perform the open/close actions substantially at the same timing in a single image frame.

Figure 17:
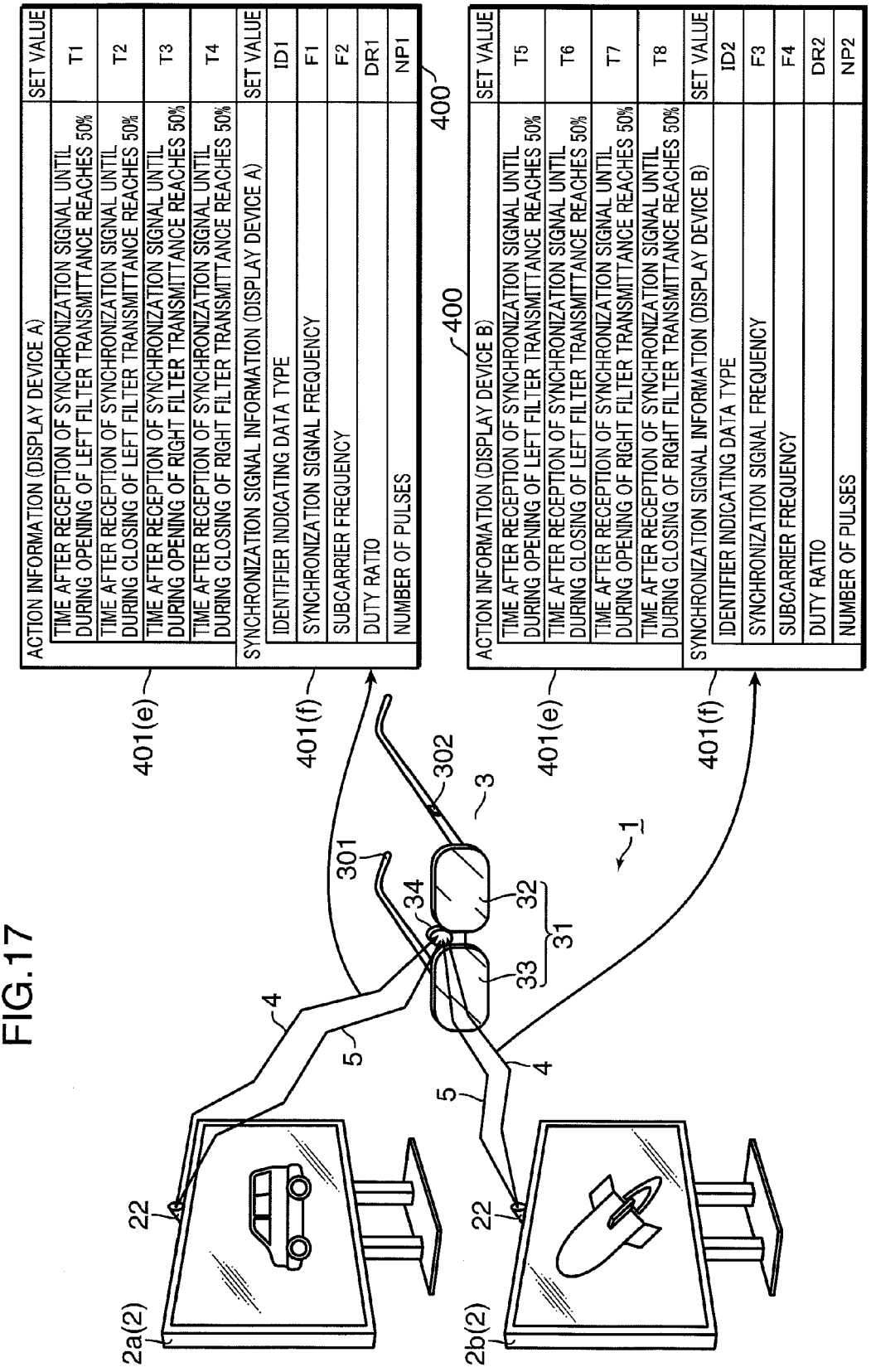
FIG. 17 schematically shows still another image system according to one embodiment of the invention.

FIG. 17 shows an image system 1 comprising two display devices 2 and one eyeglasses device 3. The image system 1 is explained referring to FIGS. 4 to 6 together with FIG. 17.

As shown in FIG. 17, the display devices 2a, 2b comprise the infrared light-emitting element 22, respectively. As explained above, the infrared light-emitting elements 22 are used as the transmission portions 221 to transmit the parameter signals 4 and the synchronization signals 5. The infrared light-receiving element 34 of the eyeglasses device 3 is used as the reception portion 341 to receive the parameter signals 4 and the synchronization signals 5 transmitted from the infrared light-emitting elements 22 of the display devices 2a, 2b. A simultaneous reception of the parameter signals 4 and/or the synchronization signals 5 from the display device 2a with the parameter signals 4 and/or the synchronization signals 5 from the display device 2b may result in their interference. In this embodiment, the power supply switch 302, the clock 37, the detection portion 351 and the analysis portion 352 mounted on the eyeglasses frame 301 form a selector switch configured to select the reception of the signals from the display devices 2a or 2b. Any other device configured to select one among the signals from a plurality of the display device, however, may be used. The clock 37 of the eyeglasses device 3 counts a time period during which the power supply switch 302 mounted on the glasses frame 301 of the eyeglasses device 3 is pressed. When the analysis portion 352 determines that the power supply switch 302 is pressed for a prescribed time, the eyeglasses device 3 moves into a selection mode to select a display device 2. During the selection mode, the detection portion 351 of the eyeglasses device 3 detects the signal intensities of the parameter signals 4 and/or the synchronization signals 5 of the display device 2a and the display device 2b, and then the analysis portion 352 of the eyeglasses device 3 determines which has the stronger signal intensity, the parameter signals 4 and/or synchronization signals 5 from the display device 2a or the parameter signals 4 and/or synchronization signals 5 from the display device 2b. After selecting the parameter signal 4 with the stronger signal intensity, the analysis portion 352 reads the action information of the optical filter portion 3 and the information relating to the synchronization signal 5 from the data portion 401(e) of "the action information" and the data portion 401(f) of "the synchronization signal information" and stores the information in the storage portion 354. The selection mode ends when the viewer releases her/his hand from the power supply switch 302. As a result, thereafter the eyeglasses device 3 identifies one among the parameter signals 4 transmitted from the display device 2a and from the display device 2b as the parameter signals 4, and then also identifies signals corresponding to the synchronization signal information included in the identified parameter signal 4 as the synchronization signals 5. As another method for selecting one of the display devices 2a and 2b, the signal from the display device 2a may be different in frequencies and periods from the signal of the display device 2b. In this case, one of the display devices 2a and 2b may be selected based on these differences.

The action information for the optical filter portion 3 included in the parameter signals 4 transmitted from the display devices 2a, 2b may be similar to that described above, but the display device 2a may transmit different settings for the action information of the optical filter portion 3 from the settings the display device 2b transmits. The information relating to the synchronization signals 5 included in the parameter signals 4 transmitted from the display devices 2a, 2b may be similar to that described above, but the display device 2a may transmit different settings for the information related to the synchronization signals 5 from the settings the display device 2b transmits. Further, the synchronization signal information data portion 401(f) shown in FIG. 17 includes information relating to an identifier indicating a data type. This information may indicate that a transmitted signal is the synchronization signal 5. Alternatively, this information may indicate that a transmitted signal is the synchronization signal 5 transmitted from the display device 2a or the synchronization signal 5 transmitted from the display device 2b. The analysis portion 352 of the eyeglasses device 3 may determine whether a signal received by the reception portion 341 is the synchronization signal 5 to be used in controlling the optical filter portion 31 based on this identifier information alone, or may also reads other characteristic information for the synchronization signal included in the data portion 401(f) of "the synchronization signal information" as necessary to determine that the signal is the synchronization signal 5 to be used in controlling the optical filter portion 31.

Figure 18:
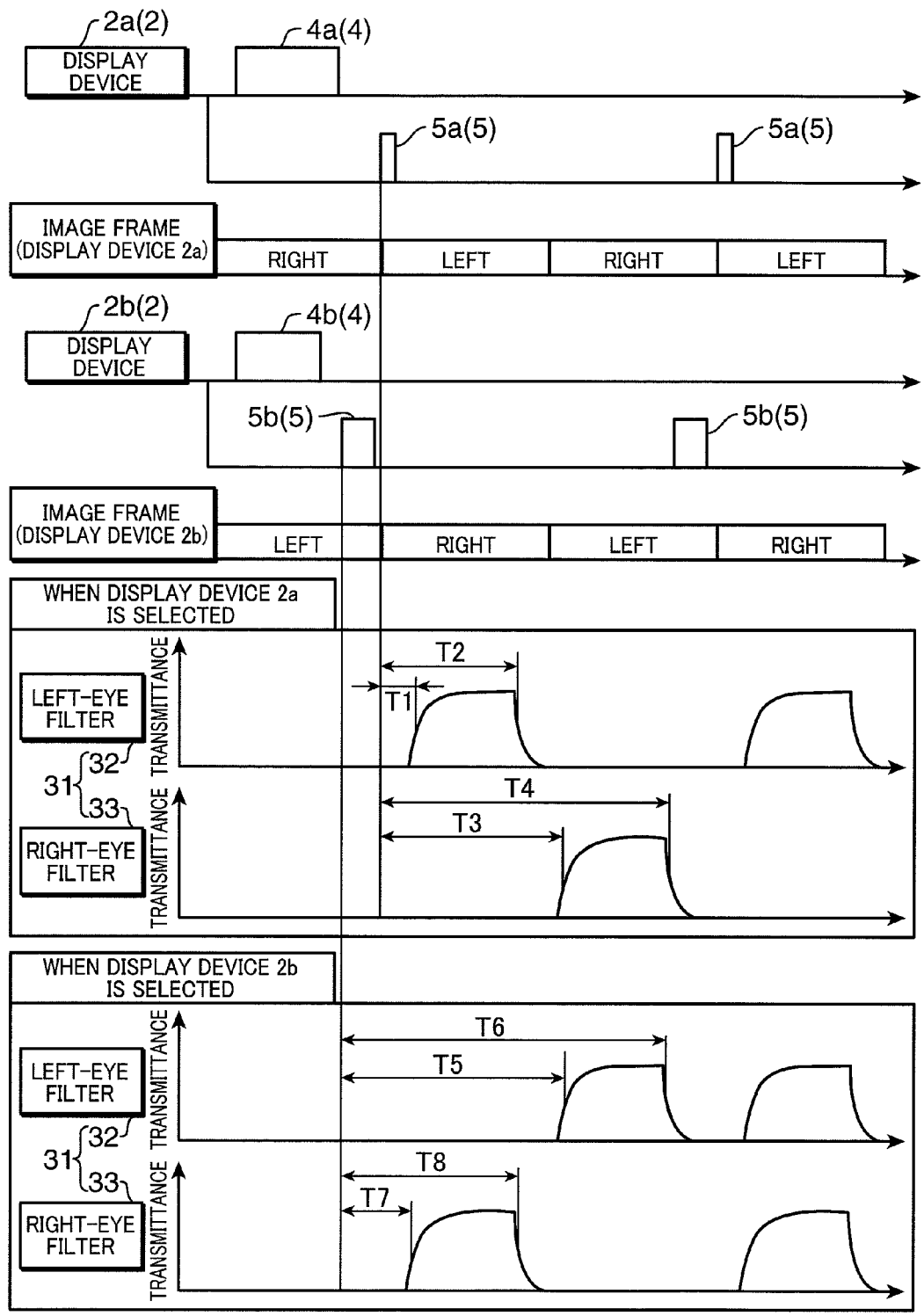
FIG. 18 explains control of the optical filter portion based on the parameter signals and the synchronization signals transmitted from the display device in the image system shown in FIG. 17.

FIG. 18 explains the control of the optical filter portion 31 in the image system 1 shown in FIG. 17. The image system 1 is explained referring to FIG. 5, FIG. 6 and FIG. 17 together with FIG. 18.

The display device 2a and the display device 2b respectively transmit the parameter signals 4a, 4b including different information with each other. Also, the display device 2a and the display device 2b respectively transmit the synchronization signals 5a, 5b generated based on different synchronization signal information. The display devices 2a, 2b may switch the frames of the displayed image at different timings, respectively.

When the display 2a is selected through the operation explained in the context of FIG. 17 for selecting either signal from the display device 2a or 2b, the optical filter portion 31 of the eyeglasses device 3 performs the open/close action based on the synchronization signals 5a. The analysis portion 352 of the eyeglasses device 3 compares the information included in the data portion 401(f) of "the synchronization signal information" stored in the storage portion 361 with the information in the signal received by the reception portion 341, and then determine whether the signal corresponds to the information included in the data portion 401(f) of "the synchronization signal information". When the signal received by the reception portion 341 corresponds to the information included in the data portion 401(f) of "the synchronization signal information", the signal received by the reception portion 341 is determined to be a synchronization signal 5 to be used in controlling the optical filter portion 31. The control portion 354 controls the optical filter portion 31 based on the action information included in the data portion 401(e) stored in the storage portion 361.

The left-eye optical filter 32 opens under control of the control portion 354 such that the image light transmittance reaches 50% the time "T1" after the reception of the synchronization signal 5a. Then, after the maximum transmittance is reached, the left-eye optical filter 32 closes such that the image light transmittance reaches 50% the time "T2" after the reception of the synchronization signal 5a.

The right-eye optical filter 33 opens under control of the control portion 354 such that the image light transmittance reaches 50% the time "T3" after the reception of the synchronization signal 5a. Then, after the maximum transmittance is reached, the right-eye optical filter 33 closes such that the image light transmittance reaches 50% the time "T4" after the reception of the synchronization signal 5a.

When the display device 2b is selected through the operation explained in the context of FIG. 17 for selecting either signal from the display device 2a or 2b, the optical filter portion 31 of the eyeglasses device 3 performs the open/close action based on the synchronization signals 5b. The analysis portion 352 of the eyeglasses device 3 compares the information included in the data portion 401(f) of "the synchronization signal information" stored in the storage portion 361 with the information in the signal received by the reception portion 341, and then determines whether the signal corresponds to the information included in the data portion 401(f) of "the synchronization signal information". When the signal received by the reception portion 341 corresponds to the information included in the data portion 401(f) of "the synchronization signal information", the signal received by the reception portion 341 is determined to be the synchronization signal 5 to be used in controlling the optical filter portion 31. The control portion 354 controls the optical filter portion 31 based on the action information included in the data portion 401(e) stored in the storage portion 361.

The left-eye optical filter 32 opens under control of the control portion 354 such that the image light transmittance reaches 50% the time "T5" after the reception of the synchronization signal 5b. Then, after the maximum transmittance is reached, the left-eye optical filter 32 closes such that the image light transmittance reaches 50% the time "T6" after the reception of the synchronization signal 5b.

The right-eye optical filter 33 opens under control of the control portion 354 such that the image light transmittance reaches 50% the time "T7" after the reception of the synchronization signal 5b. Then, after the maximum transmittance is reached, the right-eye optical filter 33 closes such that the image light transmittance reaches 50% the time "T8" after the reception of the synchronization signal 5b.

Figure 19:
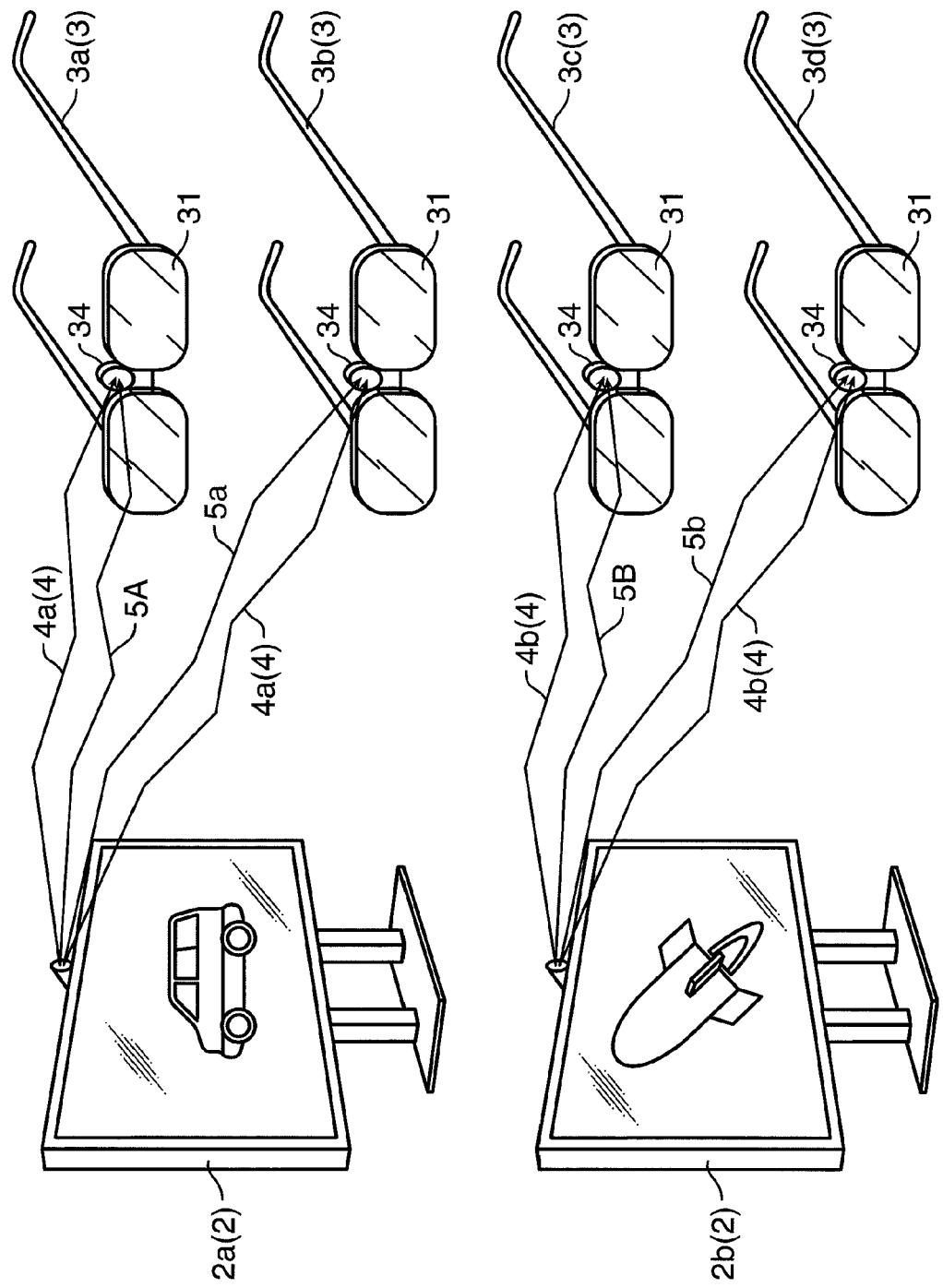
FIG. 19 schematically shows still another image system according to one embodiment of the invention.

FIG. 19 shows an image system 1 comprising a plurality of the display devices 2 and a plurality of the eyeglasses devices 3. By combining the image systems 1 explained in the context of FIG. 14 and FIG. 17, the image system 1 shown in FIG. 19 may be constructed. For example, the parameter signals 4a transmitted from the display device 2a may be selectively stored by the eyeglasses device 3a and by the eyeglasses device 3b. Similarly, the parameter signals 4b transmitted from the display device 2b may be selectively stored by the eyeglasses device 3c and by the eyeglasses device 3d.

The display device 2a transmits two types of synchronization signals 5A, 5a according to the information relating to the synchronization signals 5 included in the parameter signals 4a. The eyeglasses devices 3a, 3b may selectively use the synchronization signals 5A or 5a, based on the response characteristic information relating to the eyeglasses devices 3 included in the parameter signals 4a, to control the optical filter portions 31. Similarly, the display device 2b transmits two types of the synchronization signals 5B, 5b according to the information relating to the synchronization signals 5 included in the parameter signals 4b. The eyeglasses devices 3c, 3d may selectively use the synchronization signals 5B or 5b, based on the response characteristic information relating to the eyeglasses devices 3 included in the parameter signals 4b, to control the optical filter portions 31.

Figure 20:
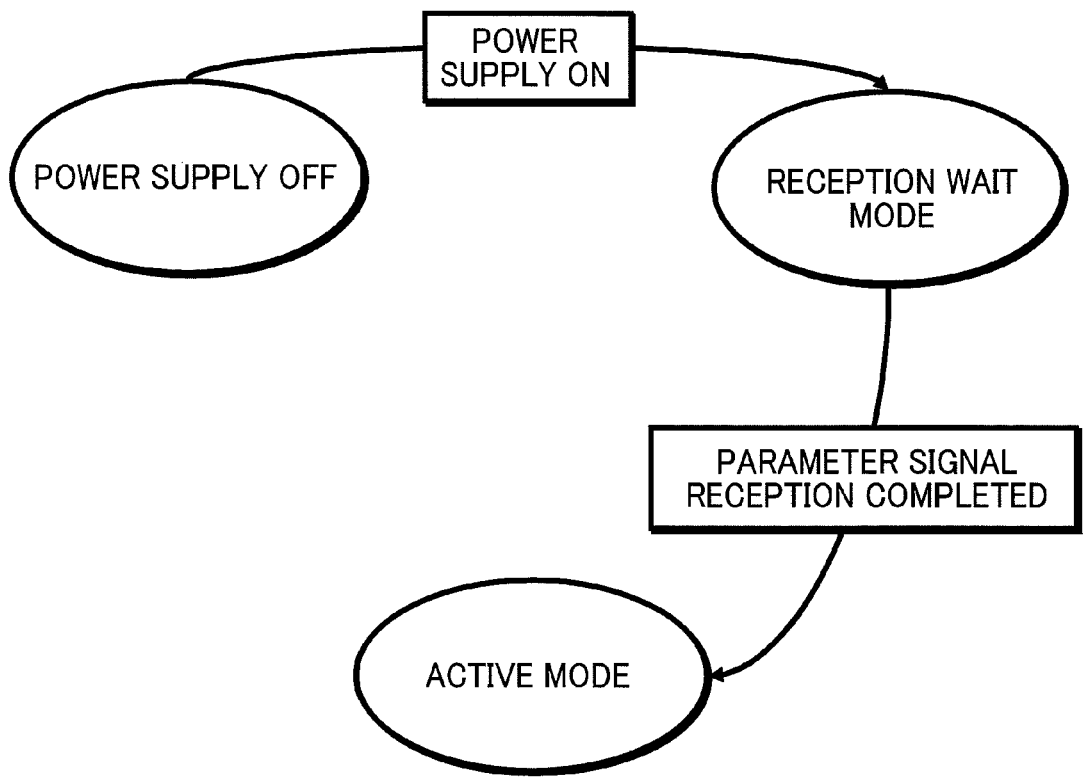
FIG. 20 shows an example of operation for the eyeglasses device of the image system shown in FIG. 1.

FIG. 20 is a conceptual diagram explaining operation up to the start of the control for the eyeglasses device 3. The operation up to the start of the control for the eyeglasses device 3 is explained referring to FIG. 1 and FIGS. 4 to 6 together with FIG. 20.

When the eyeglasses device 3 is turned on from an off-condition through the operation of the power supply switch 302 mounted on the glasses frame 301, the eyeglasses device 3 moves into the reception wait mode. During this time, the control to open or close the optical filter portion 31 of the eyeglasses device 3 is not performed. When the parameter signal 4 is transmitted from the display device 2 and the analysis portion 352 of the eyeglasses device 3 determines that the reception of the parameter signal 4 is complete, the eyeglasses device 3 moves into an active mode. The optical filter portion 31 is, then, controlled by the control portion 354, so that the open/close actions of the left-eye optical filter 32 and the right-eye optical filter 33 are started.

As another operation method, the storage portion 361 (for example, EEPROM or similar) of the eyeglasses device 3 may store the prior control which is conducted before the eyeglasses device 3 is turned on. In this case, when the eyeglasses device 3 is turned on from the off-condition, the eyeglasses device 3 moves into the reception wait mode until a new parameter signal 4 is received. During the reception wait mode, the left-eye optical filter 32 and the right-eye optical filter 33 opens and/or closes according to the control information used before the eyeglasses device 3 is turned on. When the reception of the new parameter signal 4 is complete, the eyeglasses device 3 moves into the active mode, the open/close actions of the left-eye optical filter 32 and the right-eye optical filter 33 according to the control information included in the new parameter signal 4 are started.

Figure 21:
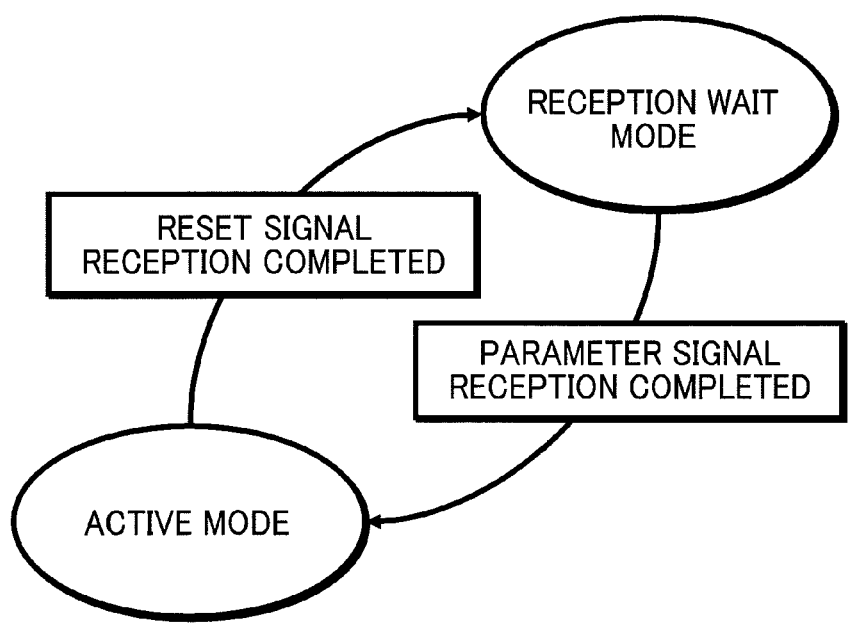
FIG. 21 shows an example of operation for the eyeglasses device of the image system shown in FIG. 1.

FIG. 21 is a conceptual diagram explaining operation to switch the active modes of the eyeglasses device 3 while a display device 2 displays the images to the reception wait mode. The operations to switch the active modes to the reception wait mode are explained referring to FIG. 1, FIG. 4 through FIG. 6, FIG. 17, and FIG. 20 together with FIG. 21.

After the optical filter portion 31 of the eyeglasses device 3 starts opening/closing through the operations explained in the context of FIG. 20, the display device 2 may transmit a reset signal to the eyeglasses device 3. For example, data indicating that the signal is a reset signal may be incorporated into the identifier indicating the data type in the data portion 401(f) of "the synchronization signal information" shown in FIG. 17. The signal generation portion 243 of the display device 2 may generate a signal having specific characteristics (for example, waveform, frequency, number of pulses, and the like) according to the incorporated data. The transmission portion 221 transmits the signal to the reception portion 341 of the eyeglasses device 3, so that the analysis portion 352 of the eyeglasses device 3 determines that the reset signal is transmitted. When the analysis portion 352 determines that the reset signal is received, the eyeglasses device 3 moves into the reception wait mode. During the reception wait mode, the optical filter portion 31 of the eyeglasses device 3 does not perform the open/close actions, so that, for example, both the left-eye optical filter 32 and the right-eye optical filter 33 are maintained in the open state (in a prescribed transmission state and the like). Alternatively, one of the left-eye optical filter 32 and the right-eye optical filter 33 may be maintained in the open state (maximum transmittance), while the other is maintained in the closed state (minimum transmittance). When receiving the new parameter signal 4, the eyeglasses device 3 moves into the active mode. As explained in the context of FIG. 20, the open/close actions of the optical filter portion 31 are started under control of the control portion 354.

Figure 22:
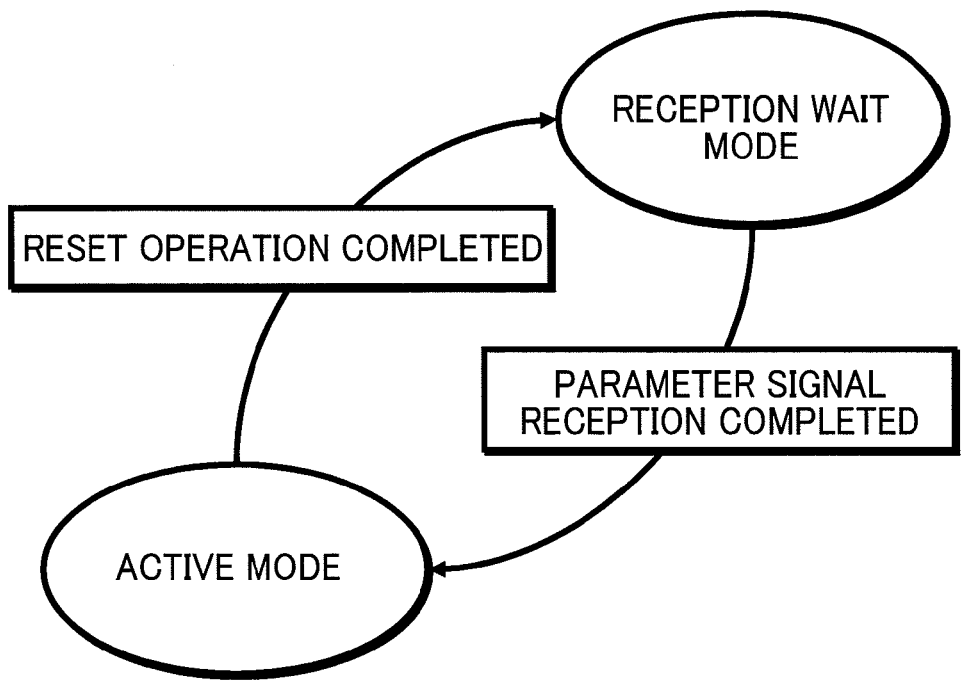
FIG. 22 shows an example of operation for the eyeglasses device of the image system shown in FIG. 1; and, FIG. 23 shows an example of operation for the eyeglasses device of the image system shown in FIG. 1.

FIG. 22 is a conceptual diagram explaining another operation to switch the active modes of the eyeglasses device 3 while the display device 2 displays the images to the reception wait mode. The operations to switch the active modes to the reception wait mode are explained referring to FIG. 1, FIGS. 4 to 6, and FIG. 21 together with FIG. 22.

In place of the reception of the reset signal explained in the context of FIG. 21, the operation shown in FIG. 22 incorporates an operation by a viewer to reset the action of the eyeglasses device 3. For example, the viewer continuously presses the power supply switch 302 built into the glasses frame 301 of the eyeglasses device 3 while the clock 37 of the eyeglasses device 3 counts the pressing time. When the analysis portion 352 determines that the viewer tries to reset the action of the eyeglasses device 3 based on the pressing time measured by the clock 37, the control portion 354 of the eyeglasses device 3 halts the control of the optical filter portion 31. Alternatively the eyeglasses device 3 may include a reset button as a reset portion in addition to the power supply switch 302. When the viewer operates the reset portion, the eyeglasses device 3 moves into the reception wait mode, so that the left-eye optical filter 32 and the right-eye optical filter 33 are both maintained, in, for example, the open state (a prescribed transmittance state or the like). Alternatively, one of the left-eye optical filter 32 and the right-eye optical filter 33 may be maintained in the open state (maximum transmittance) while the other is maintained in the closed state (minimum transmittance). By this means, the viewer may selectively view three-dimensional stereoscopic images or two-dimensional images. Other actions are similar to those explained in the context of FIG. 20.

Figure 23:
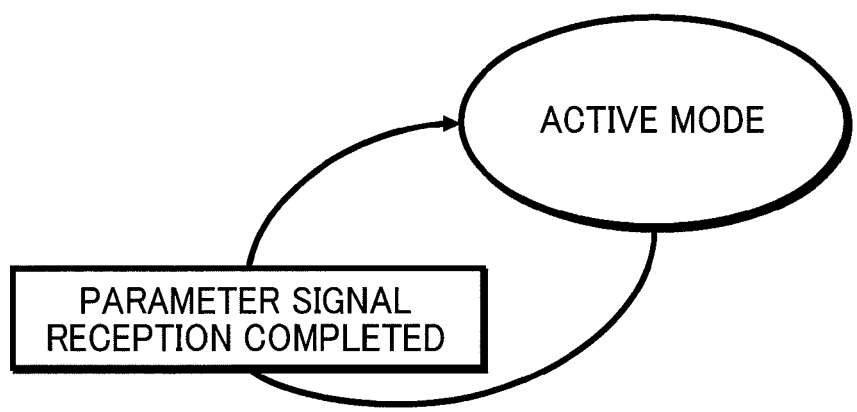

FIG. 23 is a conceptual diagram explaining another operation to switch active modes of the eyeglasses device 3 while a display device 2 displays the images to the reception wait mode. The operations to switch the active modes to the reception wait mode are explained referring to FIG. 1 and FIGS. 4 to 6 together with FIG. 23.

As explained above, in the active mode the eyeglasses device 3 performs the open/close actions based on the synchronization signals 5 transmitted from the display device 2 and the control information for the optical filter portion 31 included in the received parameter signals 4. During this time, if the parameter signal 4 including other control information is transmitted from the display device 2, the control information included in the new parameter signal 4 is stored in the storage portion 361 of the eyeglasses device 3. After the storage of the control information is complete, the eyeglasses device 3 may perform the open/close actions of the optical filter portion 31 according to the newly stored control information.

The above-described specific embodiments are primary includes the following configurations.

The image system of one aspect of the above embodiment includes a display device configured to display an image; and an eyeglasses device for viewing the image displayed by the display device. The display device includes: a display portion configured to display in time series the image to be viewed through the eyeglasses device, a signal generation portion configured to generate a synchronization signal for synchronizing timing of switching of frames of the image and a transmission portion configured to transmit the synchronization signal. The eyeglasses device includes an optical filter portion configured to adjust an amount of light of the image, a reception portion configured to receive the synchronization signal transmitted from the transmission portion and a control portion configured to control action of the optical filter portion corresponding to the switching of the frames of the image, based on the synchronization signal. The signal generation portion further generates a parameter signal including action information for defining an action of the optical filter portion. The transmission portion transmits the parameter signal to the reception portion. The control portion controls the action of the optical filter portion according to the action information of the parameter signal for defining the action of the optical filter portion.

By means of this configuration, the viewer may view images displayed by the display device through the eyeglasses device. The display device generates and transmits the synchronization signal for synchronizing the timing of the switching of the image frames. The eyeglasses device receives the synchronization signal from the display device, and then controls the actions of the optical filter portion corresponding to the switching of the image frames based on the synchronization signal. Thus, the frames of the images displayed by the display device and the actions of the optical filter portion are synchronized with each other. The display device further transmits to the eyeglasses device the parameter signal including the action information for defining the actions of the optical filter portion of the eyeglasses device. The eyeglasses device controls the actions of the optical filter portion according to the action information of the parameter signal transmitted by the display device. Therefore the actions of the optical filter portion in the eyeglasses device are determined depending on the parameter signal transmitted by the display device, so that the images may be viewed regardless of the type of eyeglasses device. Thus the above-described configuration may provide an image system which allows various combinations between the display devices and the eyeglasses devices.

In the above configuration, it is preferable that the action information includes information relating to an open time from when the reception portion receives the synchronization signal to when a transmittance of the light of the image reaches a first transmittance while the optical filter portion opens, and information relating to a close time from when the reception portion receives the synchronization signal to when the transmittance of the light of the image reaches a second transmittance while the optical filter portion closes.

By means of the above configuration, the parameter signal defines the time from when the reception portion receives the synchronization signal to when the transmittance of the light of the image reaches the first transmittance while the optical filter portion opens, so that the speeds of the opening of the optical filter portions among the eyeglasses devices in use may be adjusted. Further, the parameter signal defines the time from when the reception portion receives the synchronization signal to when the transmittance of the light of the image reaches a second transmittance while the optical filter portion closes, so that the speeds of the closing of the optical filter portions among eyeglasses devices in use may be adjusted.

In the above configuration, it is preferable that the parameter signal further comprises synchronization signal information for defining a type of the synchronization signal. The eyeglasses device may further include an analysis portion configured to analyze the signal received by the reception portion. The analysis portion may transmit the signal as the synchronization signal to the control portion if the analysis portion determines that the signal received by the reception portion is a synchronization signal defined by the synchronization signal information.

By means of the above configuration, the control portion may control the timing of the adjustment of the amount of light based on the synchronization signal defined by the synchronization signal information. Moreover the control portion may ignore the signal which is not defined by the synchronization signal information relating to control for the timing of the adjustment for the light amount.

In the above configuration, it is preferable that the eyeglasses device further includes a control signal generation portion configured to generate a control signal based on the synchronization signal and the parameter signal. The control portion may control the action of the optical filter portion corresponding to the switching of the frames of the image, based on the control signal.

By means of the above configuration, the control portion executes the control of the optical filter portion based on the control signal generated by the control signal generation portion, so that even when the synchronization signal is not received during the image display by the display device, the control portion may continue the control of the optical filter portion.

In the above configuration, it is preferable that the eyeglasses device further includes a storage portion configured to store response characteristic information relating to response characteristics of the optical filter portion. The parameter signal may include response characteristic information relating to response characteristics of the eyeglasses device to be used. The analysis portion may analyze the signal received by the reception portion, compares the response characteristic information included in the signal with the response characteristic information stored in the storage portion, and determines whether the signal received by the reception portion is to be transmitted to the control portion.

By means of the above configuration, the control portion may determine whether to control the timing of the adjustment for the light amount based on the determination of the analysis portion based on the response characteristics of the eyeglasses device.

In the above configuration, it is preferable that the eyeglasses device includes a first eyeglasses device and a second eyeglasses device having mutually different response characteristics. The response characteristic information of the parameter signal may include first characteristic information relating to the response characteristics of the first eyeglasses device, and second characteristic information relating to the response characteristics of the second eyeglasses device. The synchronization signal information may include first synchronization signal information corresponding to the first characteristic information and second synchronization signal information corresponding to the second characteristic information. The second synchronization signal information may be different from the first synchronization signal information. The action information may include first action information associated with the first synchronization signal information and second action information associated with the second synchronization signal information. The signal generation portion may generate a first synchronization signal according to the first synchronization signal information and a second synchronization signal according to the second synchronization signal information. The control portion of the first eyeglasses device may control an action of the optical filter portion of the first eyeglasses device according to the first action information when the first synchronization signal is received. The control portion of the second eyeglasses device may control an action of the optical filter portion of the second eyeglasses device according to the second action information when the second synchronization signal is received.

By means of the above configuration, when there exist a first eyeglasses device and a second eyeglasses device with mutually different response characteristics, the signal generation portion generates the synchronization signal based on mutually different synchronization signal information. In the first eyeglasses device, the timing of the adjustment for the light amount is determined by the first synchronization signal according to the first synchronization signal information, and in the second eyeglasses device, the timing of the adjustment for the light amount is determined by the second synchronization signal. Thus interference between the first eyeglasses device and the second eyeglasses device may be suppressed.

In the above configuration, it is preferable that the display device includes a first display device and a second display device. The parameter signal generated by the signal generation portion of the first display device may include synchronization signal information different from the synchronization signal information of the parameter signal generated by the signal generation portion of the second display device. The signal generation portion of the first display device may generate a first synchronization signal according to the synchronization signal information of the parameter signal of the first display device. The signal generation portion of the second display device may generate a second synchronization signal according to the synchronization signal information of the parameter signal of the second display device. The eyeglasses device may further include a selection portion configured to select either the parameter signal of the first display device or the parameter signal of the second display device. The analysis portion may compare the synchronization signal information included in the selected parameter signal with the first synchronization signal and the second synchronization signal based on the selection of the selection portion, thereby determining either the first synchronization signal or the second synchronization signal as a synchronization signal to be used for controlling the optical filter portion. The control portion may control the optical filter portion based on the signal determined to be the synchronization signal.

By means of the above configuration, the selection portion may be used to select whether the eyeglasses device should be controlled based on the first synchronization signal or based on the second synchronization signal. The analysis portion compares the synchronization signal information included in the parameter signal with the first synchronization signal and the second synchronization signal, and transmits the type of the synchronization signal defined by the synchronization signal information included in the selected parameter signal to the control portion, so that in the eyeglasses device the timing of the adjustment for the light amount is controlled based on the synchronization signal of one of the first display device and the second display device. Hence interference between the synchronization signal of the first display device and the synchronization signal of the second display device may be suppressed.

In the above configuration, it is preferable that the parameter signal is time-divided into a plurality of divisional parameter signals including mutually different information. The plurality of the divisional parameter signals, respectively, may include information relating to a total number of the divisional parameter signals and information relating to order in which the divisional parameter signals are transmitted. When the plurality of the divisional parameter signals are all transmitted, the analysis portion may construct the information included in the parameter signal based on information relating to the total number of the divisional parameter signals and information relating to the order in which the divisional parameter signals are transmitted. The control portion may control the action of the optical filter portion based on the constructed information.

By means of the above configuration, the parameter signal may be divided and transmitted. Therefore the amount of data to be transmitted with the parameter signals may be increased. Further, the information relating to the total number of the divisional parameter signals and to the transmission order for the divisional parameter signals is included in each divisional parameter signal, so that the eyeglasses device may construct the information included in the parameter signal generated by the signal generation portion in the correct order and without omissions. Further, the control portion may control the optical filter portion based on the constructed information. Thus the continuous transmission time of the parameter signal may be adjusted according to the number of divisions of the parameter signal.

In the above configuration, it is preferable that the plurality of the divisional parameter signals include a first divisional parameter signal and a second divisional parameter signal transmitted at a prescribed time after transmission of the first divisional parameter signal. The transmission portion may transmit the synchronization signal between transmission of the first divisional parameter signal and transmission of the second divisional parameter signal.

By means of the above configuration, the information included in the parameter signal is divided into the first divisional parameter signal and the second divisional parameter signal and transmitted. Further, the synchronization signal is transmitted between transmission of the first divisional parameter signal and transmission of the second divisional parameter signal. Therefore interference between the synchronization signal and the parameter signal may be suitably prevented, and also the parameter signal to be transmitted may include a greater amount of information.

In the above configuration, it is preferable that the transmission portion transmits the parameter signal within a vertical blanking interval at the time of the switching of the frames.

By means of the above configuration, interference between the parameter signal and the synchronization signal may be prevented by transmitting the parameter signal within the vertical blanking intervals because the synchronization signal does not correspond to vertical blanking.

In the above configuration, it is preferable that the transmission portion, after transmitting one of the parameter signals, transmits another parameter signal. At least one of the information relating to the open time and the information relating to the close time included in the one of the parameter signals may be different from at least the other one of the information relating to the open time and the information relating to the close time included in the other parameter signal. The control portion, after transmission of the other parameter signal, may control the optical filter portion according to the other parameter signal, thereby changing at least one of the open time and the close time.

By means of the above configuration, by subsequently transmitting the parameter signal with different information relating to the open time and/or the close time, control of the open time and/or the close time may be modified.

In the above configuration, it is preferable that the information relating to the open time includes information relating to a first open time and information relating to a second open time different from the first open time. The synchronization signal information may include first synchronization signal information corresponding to information relating to the first open time and second synchronization signal information corresponding to information relating to the second open time. The second synchronization signal information may be different from the first synchronization signal information. The signal generation portion may be configured to generate a first synchronization signal according to the first synchronization signal information and a second synchronization signal according to the second synchronization signal information. When the transmission portion, after transmitting one of the first synchronization signal and the second synchronization signal, subsequently transmits the other of the signals, the control portion may operate the optical filter portion with changing the open time.

By means of the above configuration, the parameter signal includes information for the first open time and the second open time which are mutually different. The parameter signal further includes the first synchronization signal information corresponding to the first open time and the second synchronization signal information corresponding to the second open time. The signal generation portion generates the first synchronization signal according to the first synchronization signal information and the second synchronization signal according to the second synchronization signal information, therefore the signal generation portion may selectively modify the open time of the optical filter portion according to the type of synchronization signal generated In the above configuration, it is preferable that information relating to the close time includes information relating to a first close time and information relating to a second close time different from the first close time. The synchronization signal information may include first synchronization signal information corresponding to the information relating to the first close time, and second synchronization signal information corresponding to information relating to the second close time, the second synchronization signal information is different from the first synchronization signal information. The signal generation portion may be configured to generate a first synchronization signal according to the first synchronization signal information and a second synchronization signal according to the second synchronization signal information. When the transmission portion, after transmitting one of the first synchronization signal and the second synchronization signal, subsequently transmits the other of the signals, the control portion may operate the optical filter portion with changing the close time.

By means of the above configuration, the parameter signal includes the information for the first close time and the second close time which are mutually different. The parameter signal further includes the first synchronization signal information corresponding to the first close time and the second synchronization signal information corresponding to the second close time. The signal generation portion generates the first synchronization signal according to the first synchronization signal information and the second synchronization signal according to the second synchronization signal information, and therefore the signal generation portion may selectively modify the close time of the optical filter portion according to the type of synchronization signal generated.

In the above configuration, it is preferable that the control portion does not control the optical filter portion from the time when the eyeglasses device is turned on to when the reception portion receives the parameter signal.

By means of the above configuration, the optical filter portion is not controlled until the parameter signal is received.

In the above configuration, it is preferable that the eyeglasses device further includes a storage portion configured to store prescribed action information relating to adjustment for the amount of the light through the optical filter portion. The control portion may control the optical filter portion according to the prescribed action information stored in the storage portion and according to the synchronization signal until the reception portion receives the parameter signal.

By means of the above configuration, the optical filter portion is controlled according to the action information stored in the storage portion until the parameter signal is received.

In the above configuration, it is preferable that the signal generation portion further generates a reset signal. When the reception portion receives the reset signal, the control portion may maintain the transmittance for the light from the image through the optical filter portion at a prescribed value.

By means of the above configuration, after the reset signal is received, the amount of the image light transmitted by the optical filter portion may be held constant.

In the above configuration, it is preferable that the eyeglasses device further includes a reset portion configured to reset the eyeglasses device according to an operation by a viewer. The control portion may maintain the transmittance for the light of the image through the optical filter portion at a prescribed value in response to the operation to the reset portion.

By means of this configuration, the reset portion may be operated if the viewer wants, so that the amount of the image light transmitted by the optical filter portion may be held constant.

The display device of another aspect of the above embodiment comprises a display portion configured to display in time series an image to be viewed through an eyeglasses device configured to adjust an amount of light, a signal generation portion configured to generate a synchronization signal for synchronizing timing of switching of frames of the image and a transmission portion configured to transmit the synchronization signal. The signal generation portion may further generate a parameter signal including action information for defining an action of the eyeglasses device regarding adjustment of the amount of the light of the image.

By means of this configuration, the display device may transmit the synchronization signal for synchronizing the timing of the switching of the image frames and the parameter signal including the action information for defining the actions of the eyeglasses device regarding adjustment for the amount of the image light. Thus, the timing and action of the light amount adjustment may be controlled for numerous types of the eyeglasses devices.

The eyeglasses device of still another aspect of the above embodiment comprises an optical filter portion configured to adjust an amount of light of an image, a reception portion configured to receive a synchronization signal for synchronizing timing of switching of frames of the image and a parameter signal including action information for defining an action of the optical filter portion and a control portion configured to control the optical filter portion corresponding to the switching of the frames of the image based on the synchronization signal and the parameter signal according to the action information of the parameter signal for defining the action of the optical filter portion.

By means of the above configuration, the eyeglasses device may control the actions of the optical filter portion corresponding to the switching of the image frames, based on the received synchronization signal and the received parameter signal. Therefore the eyeglasses device may control the timing and the action of light amount adjustment corresponding to numerous types of the display devices.

This application is based on U.S. Provisional Application No. 61/185,683 filed on Jun. 10, 2009, the contents of which are hereby incorporated by reference.

Specific embodiments or practical examples described in the detailed explanation of the invention are merely intended to clarify the technical content of the invention, and should not be narrowly understood as being limited to only the specific examples; various modifications can be made within the spirit of the invention and within the scope of the claims stated herebelow.

What is claimed is:

1. An eyeglasses device, comprising:
a left-eye optical filter configured to adjust an amount of light of an image which reaches a left eye of a viewer;
a right-eye optical filter configured to adjust an amount of light of the image which reaches a right eye of the viewer;
a reception portion configured to receive a parameter signal and a synchronization signal from a display device which displays the image; and
a control portion configured to control the left-eye and right-eye optical filters based on the parameter signal,
wherein the reception portion receives the synchronization signal in synchronization with switching of frames of the image and the parameter signal in a different cycle from the synchronization signal,
wherein the parameter signal includes time information which indicates:
(i) a time period from reception of the synchronization signal until the left-eye optical filter opens to achieve a predetermined transmittance,
(ii) a time period from the reception of the synchronization signal until the left-eye optical filter closes to achieve the predetermined transmittance,
(iii) a time period from the reception of the synchronization signal until the right-eye optical filter opens to achieve the predetermined transmittance, and
(iv) a time period from the reception of the synchronization signal until the right-eye optical filter closes to achieve the predetermined transmittance, and
wherein the control portion adjusts transmittance of the left-eye and right-eye optical filters in response to the time information.

2. The eyeglasses device according to claim 1, wherein the reception portion receives the parameter signal less frequently than a frame rate of the image.

3. The eyeglasses device according to claim 1, wherein the predetermined transmittance is 50%.

4. A display device for displaying an image viewed through an eyeglasses device having a left-eye optical filter configured to adjust a light amount, which reaches a left eye of a viewer, and a right-eye optical filter configured to adjust a light amount, which reaches a right eye of the viewer, comprising:

a signal generation portion configured to generate a synchronization signal and a parameter signal; and a transmission portion configured to transmit the synchronization signal in synchronization with switching of frames of the image, wherein the transmission portion transmits the parameter signal including time information to the eyeglasses device in a different cycle from the synchronization signal, the time information including:
  (i) a time period from reception of the synchronization signal until the left-eye optical filter opens to achieve a predetermined transmittance,
  (ii) a time period from the reception of the synchronization signal until the left-eye optical filter closes to achieve the predetermined transmittance,
  (iii) a time period from the reception of the synchronization signal until the right-eye optical filter opens to achieve the predetermined transmittance, and
  (iv) a time period from the reception of the synchronization signal until the right-eye optical filter closes to achieve the predetermined transmittance.

5. The display device according to claim 4, wherein the transmittance portion transmits the parameter signal less frequently than a frame rate of the image.

6. The display device according to claim 4, wherein the predetermined transmittance is 50%.

7. An image system, comprising:
a display device configured to display an image; and
an eyeglasses device including a left-eye optical filter configured to adjust an amount of light of the image which reaches a left eye of a viewer, and a right-eye optical filter configured to adjust an amount of light of the image which reaches a right eye of the viewer,
wherein the display device includes:
  a signal generation portion configured to generate a synchronization signal and a parameter signal; and
  a transmission portion configured to transmit the synchronization signal in synchronization with switching of frames of the image,
wherein the transmission portion transmits the parameter signal including time information to the eyeglasses device in a different cycle from the synchronization signal, the time information indicating:
  (i) a time period from reception of the synchronization signal until the left-eye optical filter opens to achieve a predetermined transmittance,
  (ii) a time period from the reception of the synchronization signal until the left-eye optical filter closes to achieve the predetermined transmittance,
  (iii) a time period from the reception of the synchronization signal until the right-eye optical filter opens to achieve the predetermined transmittance, and
  (iv) a time period from the reception of the synchronization signal until the right-eye optical filter closes to achieve the predetermined transmittance,
wherein the eyeglasses device includes:
  a reception portion configured to receive the parameter signal and the synchronization signal; and
  a control portion configured to control the left-eye and right-eye optical filters based on the parameter signal,
wherein the reception portion receives the synchronization signal in synchronization with switching of frames of the image, and
wherein the control portion adjusts transmission of the left-eye and right eye optical filters in response to the time information.

8. A method for controlling an eyeglasses device, comprising:
receiving a parameter signal from a display device which displays an image, the parameter signal including time information which indicates
  (i) a time period from reception of a synchronization signal in synchronization with switching of frames of an image until a left-eye optical filter configured to adjust an amount of light of the image which reaches a left eye of a viewer opens to achieve a predetermined transmittance,
  (ii) a time period from the reception of the synchronization signal until the left-eye optical filter closes to achieve the predetermined transmittance,
  (iii) a time period from the reception of the synchronization signal until a right-eye optical filter configured to adjust an amount of light of the image which reaches a right eye of the viewer opens to achieve the predetermined transmittance, and
  (iv) a time period from the reception of the synchronization signal until the right-eye optical filter closes to achieve the predetermined transmittance;
receiving the synchronization signal in a different cycle from the parameter signal; and
adjusting transmittance of the left-eye and right-eye optical filters in response to the time information.

* * * * *